(12) United States Patent
Mellor

(10) Patent No.: US 8,939,400 B2
(45) Date of Patent: Jan. 27, 2015

(54) AIR-GROUND DETECTION SYSTEM FOR SEMI-LEVERED LANDING GEAR

(75) Inventor: Mitchell Loren Ray Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 13/031,525

(22) Filed: Feb. 21, 2011

(65) Prior Publication Data

US 2012/0211600 A1  Aug. 23, 2012

(51) Int. Cl.
*B64C 25/34* (2006.01)
*B64C 25/00* (2006.01)

(52) U.S. Cl.
CPC ........... *B64C 25/00* (2013.01); *B64C 2025/008* (2013.01)
USPC ................................... 244/100 R; 244/102 R

(58) Field of Classification Search
USPC ................... 244/102 R, 102 A, 103 R, 100 R
See application file for complete search history.

(56) References Cited

U.S. PATENT DOCUMENTS

| | | |
|---|---|---|
| 2,193,736 A | 3/1940 | Onions |
| 2,783,744 A | 3/1957 | Tennis |
| 2,932,281 A | 4/1960 | Moskowitz |
| 3,082,980 A | 3/1963 | Lucien |
| 3,083,937 A | 4/1963 | Bainbridge et al. |
| 3,188,922 A | 6/1965 | Cruse |
| 3,237,726 A | 3/1966 | Deyerling |
| 3,290,038 A | 12/1966 | Tollar |
| 3,322,376 A | 5/1967 | Neilson et al. |
| 3,335,642 A | 8/1967 | Rosaen |
| 3,426,651 A | 2/1969 | Arendarski |
| 3,533,613 A | 10/1970 | Bendicsen |
| 3,568,705 A | 3/1971 | Boyadjieff et al. |
| 3,578,303 A | 5/1971 | Fullam |
| 3,724,832 A | 4/1973 | Ceska |
| 3,845,919 A * | 11/1974 | Jenny ........................ 244/103 R |
| 3,869,861 A | 3/1975 | Case |
| 4,007,894 A | 2/1977 | Hartel |

(Continued)

FOREIGN PATENT DOCUMENTS

| EP | 0295174 | 12/1988 |
|---|---|---|
| EP | 0614804 A1 | 9/1994 |

(Continued)

OTHER PUBLICATIONS

U.S. Appl. No. 12/730,598, filed Mar. 24, 2010, Mellor.

(Continued)

*Primary Examiner* — Rob Swiatek
*Assistant Examiner* — Vicente Rodriguez
(74) *Attorney, Agent, or Firm* — Yee & Associates, P.C.

(57) ABSTRACT

A method and apparatus for air-ground detection. A truck beam of a semi-levered landing gear is mounted on a pivot pin. The truck beam is configured to rotate about the pivot pin between a toes down position and a toes up position. A positioning mechanism is connected to a semi-levered linkage assembly that secures an angle of the truck beam in the toes up position. The semi-levered linkage assembly is secured in a steady state and configured to change from the steady state to a locked state in response to an initial ground contact. A sensor is connected to the semi-levered linkage assembly. The sensor is configured to detect a change from the steady state to the locked state.

10 Claims, 17 Drawing Sheets

(56) References Cited

U.S. PATENT DOCUMENTS

| | | | |
|---|---|---|---|
| 4,061,295 A | 12/1977 | Somm | |
| 4,075,929 A | 2/1978 | Peterson | |
| 4,088,286 A | 5/1978 | Masclet et al. | |
| 4,284,255 A | 8/1981 | Masclet et al. | |
| 4,291,850 A | 9/1981 | Sharples | |
| 4,359,199 A | 11/1982 | Kramer et al. | |
| 4,381,857 A | 5/1983 | Cook | |
| 4,402,477 A * | 9/1983 | Turiot et al. | 244/102 R |
| 4,445,672 A | 5/1984 | Turiot | |
| 4,457,212 A | 7/1984 | Unger et al. | |
| 4,746,086 A | 5/1988 | Happ | |
| 4,749,152 A | 6/1988 | Veaux et al. | |
| 4,749,452 A | 6/1988 | LaConti et al. | |
| 4,770,372 A | 9/1988 | Ralph | |
| 4,869,444 A | 9/1989 | Ralph | |
| 4,892,270 A * | 1/1990 | Derrien et al. | 244/104 R |
| 4,940,197 A | 7/1990 | Putnam | |
| 5,029,775 A | 7/1991 | Abramovitsh | |
| 5,086,995 A | 2/1992 | Large | |
| 5,094,407 A | 3/1992 | Jampy et al. | |
| 5,140,894 A | 8/1992 | Snyder et al. | |
| 5,148,896 A | 9/1992 | Ralph | |
| 5,157,267 A | 10/1992 | Shirata et al. | |
| 5,219,152 A | 6/1993 | Derrien et al. | |
| 5,271,314 A | 12/1993 | Derrien | |
| 5,299,761 A | 4/1994 | Robin et al. | |
| 5,310,140 A | 5/1994 | Veaux et al. | |
| 5,390,586 A | 2/1995 | Jones | |
| 5,396,973 A | 3/1995 | Schwemmer et al. | |
| 5,429,323 A | 7/1995 | Derrien et al. | |
| 5,460,340 A * | 10/1995 | White | 244/102 A |
| 5,908,174 A | 6/1999 | Churchill et al. | |
| 6,182,925 B1 | 2/2001 | Kilner et al. | |
| 6,237,407 B1 * | 5/2001 | Nance | 73/178 T |
| 6,345,564 B1 | 2/2002 | Kilner et al. | |
| 6,575,405 B2 * | 6/2003 | Bryant et al. | 244/102 SL |
| 7,426,983 B2 | 9/2008 | Ducos et al. | |
| 7,802,488 B2 | 9/2010 | Bucheton et al. | |
| 8,104,711 B2 | 1/2012 | Bennett et al. | |
| 2005/0011991 A1 | 1/2005 | Ducos et al. | |
| 2006/0220917 A1* | 10/2006 | Nance | 340/960 |
| 2007/0068754 A1 | 3/2007 | Furgala | |
| 2007/0194172 A1 | 8/2007 | Luce et al. | |
| 2009/0050736 A1 | 2/2009 | Bennett et al. | |
| 2009/0108131 A1* | 4/2009 | Lavigne et al. | 244/102 A |
| 2009/0200760 A1 | 8/2009 | Gartner et al. | |
| 2009/0210105 A1 | 8/2009 | Lusby et al. | |
| 2010/0096499 A1 | 4/2010 | Luce et al. | |
| 2010/0116930 A1* | 5/2010 | Griffin | 244/102 A |
| 2010/0116931 A1 | 5/2010 | Wilby | |
| 2010/0181423 A1 | 7/2010 | Martin et al. | |
| 2010/0187353 A1 | 7/2010 | Masson et al. | |
| 2010/0219290 A1 | 9/2010 | Luce | |
| 2011/0025966 A1 | 2/2011 | Sakai | |
| 2011/0233327 A1* | 9/2011 | Mellor et al. | 244/102 A |
| 2012/0126055 A1 | 5/2012 | Lindahl et al. | |
| 2012/0247892 A1 | 10/2012 | Cottet | |

FOREIGN PATENT DOCUMENTS

| | | |
|---|---|---|
| EP | 0743245 | 11/1996 |
| EP | 1041001 | 10/2000 |
| EP | 1749741 | 2/2007 |
| EP | 2489591 A1 | 8/2012 |
| FR | 2849830 A1 | 7/2004 |
| GB | 594541 A | 11/1947 |
| GB | 1024455 A | 3/1966 |
| GB | 2101542 | 1/1983 |
| GB | 2428650 | 2/2007 |
| WO | 2006094145 | 9/2006 |
| WO | WO 2006094145 A1 * | 9/2006 |
| WO | 2006133902 | 12/2006 |
| WO | 2007015104 | 2/2007 |
| WO | 2007015104 A1 | 2/2007 |
| WO | 2011119283 | 9/2011 |

OTHER PUBLICATIONS

U.S. Appl. No. 12/951,861, filed Nov. 22, 2010, Lindahl et al.
Lindahl et al., "Hydraulic Actuator for Semi Levered Landing Gear", U.S. Appl. No. 12/951,861, filed Nov. 22, 2010, 46 pages.
Cottet, "Landing Gear System", U.S. Appl. No. 13/078,075, filed Apr. 1, 2011, 48 pages.
"Semi-Levered Gear Performs During Boeing 777-300ER Flight-Tests", Boeing news release, LeBourget, France, Jun. 2003, accessed May 15, 2012, 2 pages http://www.boeing.com/news/releases/2003/photorelease/q2/pr_030618gl.html.
PCT Search Report dated Aug. 4, 2011 regarding application PCT/US2011/025966 dated Feb. 23, 2011, applicant reference 09-0834PCT, applicant The Boeing Company, 13 pages.
EP Search Report dated Jun. 22, 2012 regarding application 12156210.2-2422, applicant reference NAM/P120557EP00, applicant The Boeing Company, 6 pages.
Long, "Semi-Lever Landing Gear", The Boeing Company, Oct. 2001, 13 pages.
Lindahl et al., "Hydraulic Strut Assembly for Semi-Levered Landing Gear," U.S. Appl. No. 13/474,332, filed May 17, 2012, 98 pages.
Office Action, dated Sep. 13, 2012, regarding U.S. Appl. No. 12/730,598, 10 pages. (038190/371773).
Notice of Allowance, dated Jan. 28, 2013, regarding U.S. Appl. No. 12/730,598, 5 pages. (038190/371773).
Office Action, dated Jan. 7, 2013, regarding U.S. Appl. No. 12/951,861, 20 pages.
Extended European Search Report, dated Mar. 4, 2014, regarding Application No. EP12159953.4, 6 pages.
Final Office Action, dated Jun. 21, 2013, regarding U.S. Appl. No. 12/951,861, 14 pages.
Extended European Search Report, dated Aug. 22, 2014, regarding Application No. 11188624.8, 10 pages.
Office Action, dated Jun. 2, 2014, regarding U.S. Appl. No. 13/031,525, 37 pages.
Office Action, dated Jul. 30, 2014, regarding U.S. Appl. No. 13/474,332, 26 pages.

* cited by examiner

AIR-GROUND DETECTION SYSTEM FOR SEMI-LEVERED LANDING GEAR

BACKGROUND INFORMATION

1. Field

The present disclosure relates generally to landing gear and, in particular, to semi-levered landing gear. Still more particularly, the present disclosure relates to an air-ground detection system for semi-levered landing gear.

2. Background

Many airplanes include landing gear to facilitate takeoff, landing, and taxi. The landing gear of some aircraft includes a shock absorber that is pivotally connected to a truck beam at a distal or lower end thereof. The truck beam typically includes two or more axles upon which tires are mounted. In this regard, the truck beam may include a forward axle positioned forward of the shock absorber and an aft axle positioned aft of the shock absorber. Wheels may be mounted on an axle in tandem pairs.

During landing in conventional airplanes, a truck tilt actuator may position tandem axle wheels in a toes up position or a toes down position. The toes up position is a configuration in which the forward wheels on the main landing gear are at a higher position than that of the rear wheels on the main landing gear. A toes down position is a configuration in which the forward wheels are at a lower position than that of the rear wheels on the main landing gear. Upon landing, the force of touchdown causes the truck beam to rotate so that front and rear wheels are aligned substantially horizontally on the ground.

Air-ground detection systems determine when the landing gear wheel or wheels touch the ground during landing for spoiler deployment, brake activation, and/or other desirable functions. Conventional aircraft may utilize air-ground detection sensors which detect rotation of the truck beam and use this rotation to determine when landing gear wheels make contact with the ground.

However, this type of air-ground sensing system may not be usable with, or appropriate for, all types of landing gear. Accordingly, it would be advantageous to have a method and apparatus which takes into account one or more of the issues discussed above, as well as possibly other issues.

SUMMARY

One advantageous embodiment provides an air-ground detection system. A truck beam of a semi-levered landing gear is mounted on a pivot pin. The truck beam is configured to rotate about the pivot pin between a toes down position and a toes up position. A positioning mechanism is connected to a locking mechanism that secures an angle of the truck beam in the toes up position. The locking mechanism is secured in a steady state and configured to change from the steady state to a locked state in response to initial ground contact. A sensor is connected to the locking mechanism. The sensor is configured to detect a change from the steady state to the locked state.

In another advantageous embodiment, a method is provided for air-ground detection in a semi-levered landing gear. An orientation of a number of links of a semi-levered linkage assembly is monitored. An initial ground contact position of the semi-levered landing gear is indicated in response to detecting the semi-levered linkage assembly changing from a steady state to a locked state.

In yet another advantageous embodiment, a vehicle includes a fuselage, a wing connected to the fuselage, and a semi-levered landing gear assembly. The semi-levered landing gear assembly is connected to at least one of the fuselage, the wing, and an actuator. The semi-levered landing gear assembly comprises a truck beam connected to a shock absorber and mounted on a pivot pin enabling the truck beam to rotate from a toes up position to a toes down position. A number of positioning springs are connected to a semi-levered linkage assembly. The number of positioning springs includes a tension spring. A compression spring exerts force in opposition to secure the semi-levered linkage assembly in a steady state. The semi-levered linkage assembly is connected to the truck beam and the shock absorber in the steady state prior to initial ground contact during a landing procedure. A number of links within the semi-levered linkage assembly is configured to change orientation from the steady state to a locked state in response to an initial ground contact of a number of aft wheels with a ground. A sensor connected to the semi-levered linkage assembly detects a change in the orientation of the number of links from the steady state to the locked state. The sensor is configured to generate a signal indicating an occurrence of the initial ground contact in response to detecting the change in the orientation from the steady state to the locked state.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
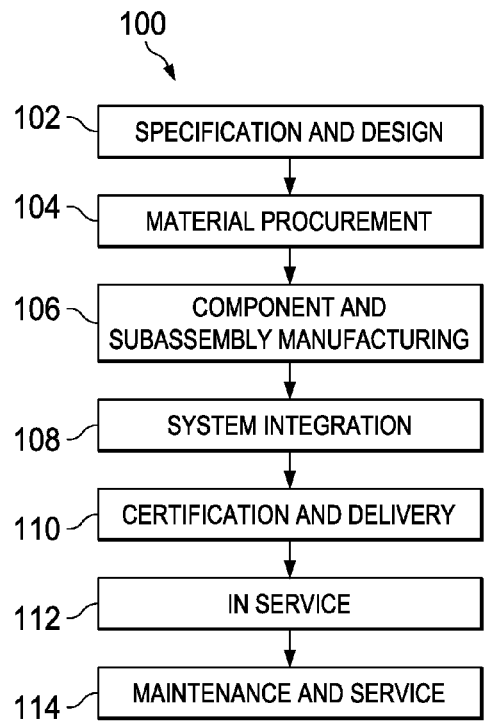
FIG. 1 is an illustration of an aircraft manufacturing and service method in accordance with an advantageous embodiment.
Figure 2:
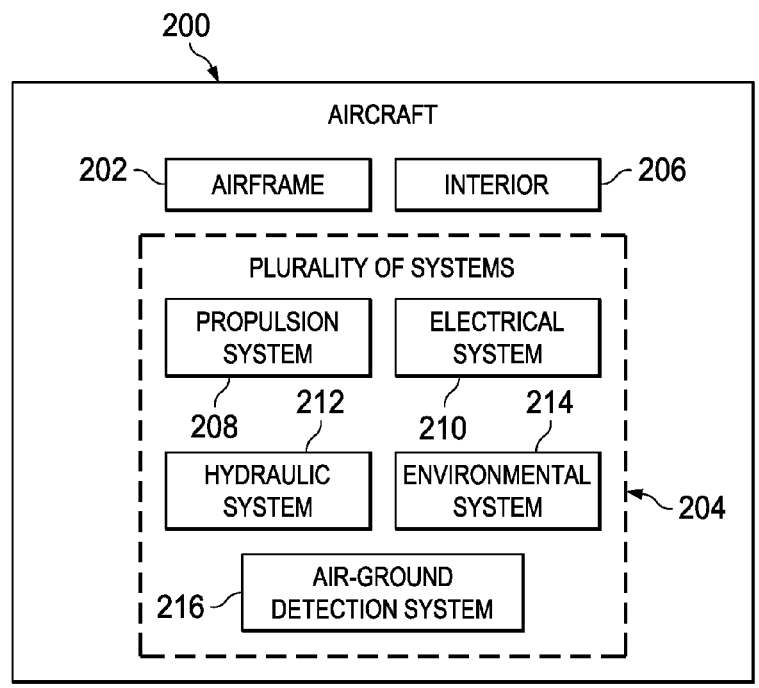
FIG. 2 is an illustration of an aircraft in which an advantageous embodiment may be implemented.

Referring more particularly to the drawings, advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or services.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and air-ground detection system 216. Air-ground detection system 216 is described further herein, such as with respect to FIGS. 3-18. Any number of other systems may be included. Although an aerospace example is shown, different advantageous embodiments may be applied to other industries, such as the automotive industry. Apparatuses and methods embodied herein may be employed during at least one of the stages of aircraft manufacturing and service method 100 in FIG. 1.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments.

A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200. For example, different advantageous embodiments may be used to add, upgrade, or use air-ground detection system 216 in aircraft 200. For example, air-ground detection system 216, in accordance with an advantageous embodiment, may be manufactured during component and subassembly manufacturing 106 added to aircraft 200 during system integration 108 and used during in service 112. As another illustrative example, air-ground detection system 216 may be added to aircraft 200 during maintenance and service 114.

The different advantageous embodiments recognize and take into account a number of different considerations. For example, different advantageous embodiments recognize and take into account that not all air-ground detection systems are appropriate for all types of landing gear. For example, such a system may not be appropriate or optimal for use in an aircraft that uses a semi-levered landing gear.

The different advantageous embodiments recognize and take into account that another type of air-ground detection system for semi-levered landing gears may use strain gauges connected to axles or truck beams to detect early ground contact. A strain gauge measures strain on an object. A strain gauge may be used to detect strain on a component, such as an axle or a truck beam, caused by an increased load applied to the component when the wheels touch the ground. The detected strain indicates that the vehicle has touched down. The different advantageous embodiments recognize and take into account that strain gauges, however, may have a limited life and may not be as reliable as desired.

The advantageous embodiments described herein recognize and take into account one or more of the issues described above. Thus, the different advantageous embodiments provide a method and apparatus for an air-ground detection system. In an advantageous embodiment, a semi-levered landing gear fixedly positions the truck beam with respect to the shock absorber during takeoff and landing. During landing, the semi-levered landing gear assembly is lowered with the forward axle higher than the aft axle in a toes up position. Upon touchdown, wheels on the forward axle and the aft axle equally bear the weight of the aircraft.

In an advantageous embodiment, a semi-levered landing gear may constrain rotation of the truck beam such that truck beam rotation might not be usable as an early indicator of ground contact. Instead, a semi-levered landing gear air-ground detection system may use shock absorber compression as an early indicator of ground contact. This system attempts to detect rotation of the truck beam or compression of the shock absorber to indicate ground contact. However, this shock absorber compression system may require more load on the shock absorber to rotate the truck beam or compress the shock absorber than is used by conventional air-ground detection systems. As a result, this system may be less sensitive.

Figure 3:
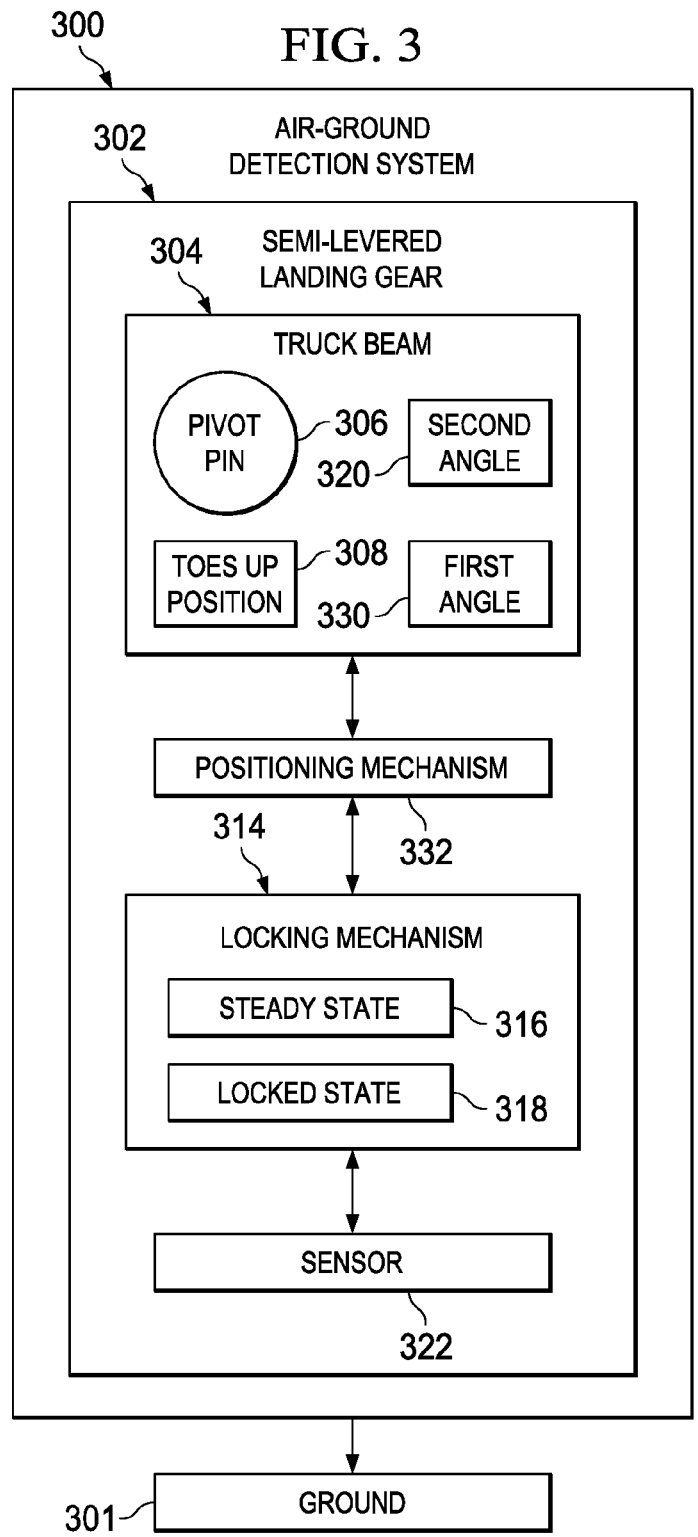
FIG. 3 is an illustration of a block diagram of an air-ground detection system in which an advantageous embodiment may be implemented.

Turning now to FIG. 3, an illustration of a block diagram of an air-ground detection system is depicted in which an advantageous embodiment may be implemented. Air-ground detection system 300 illustrates one example of components that may be used in air-ground detection system 216 in FIG. 2. In this particular example, air-ground detection system 300 is configured to detect initial ground contact with the ground 301 or any other surface by semi-levered landing gear 302.

Semi-levered landing gear 302, in this illustrative example, includes truck beam 304 mounted on pivot pin 306. Truck beam 304 may also be referred to as a bogie beam. Truck beam 304 rotates or pivots about pivot pin 306 to toes up position 308.

Figure 5:
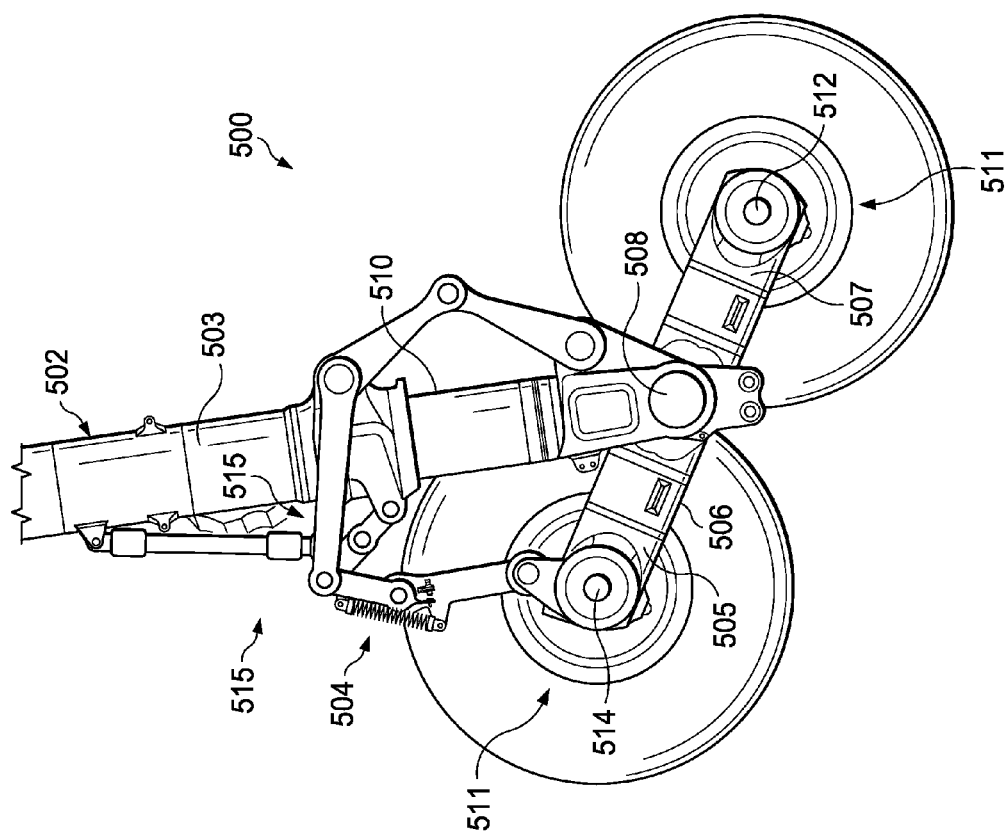
FIG. 5 is an illustration of a semi-levered landing gear assembly in accordance with an advantageous embodiment.
Figure 6:
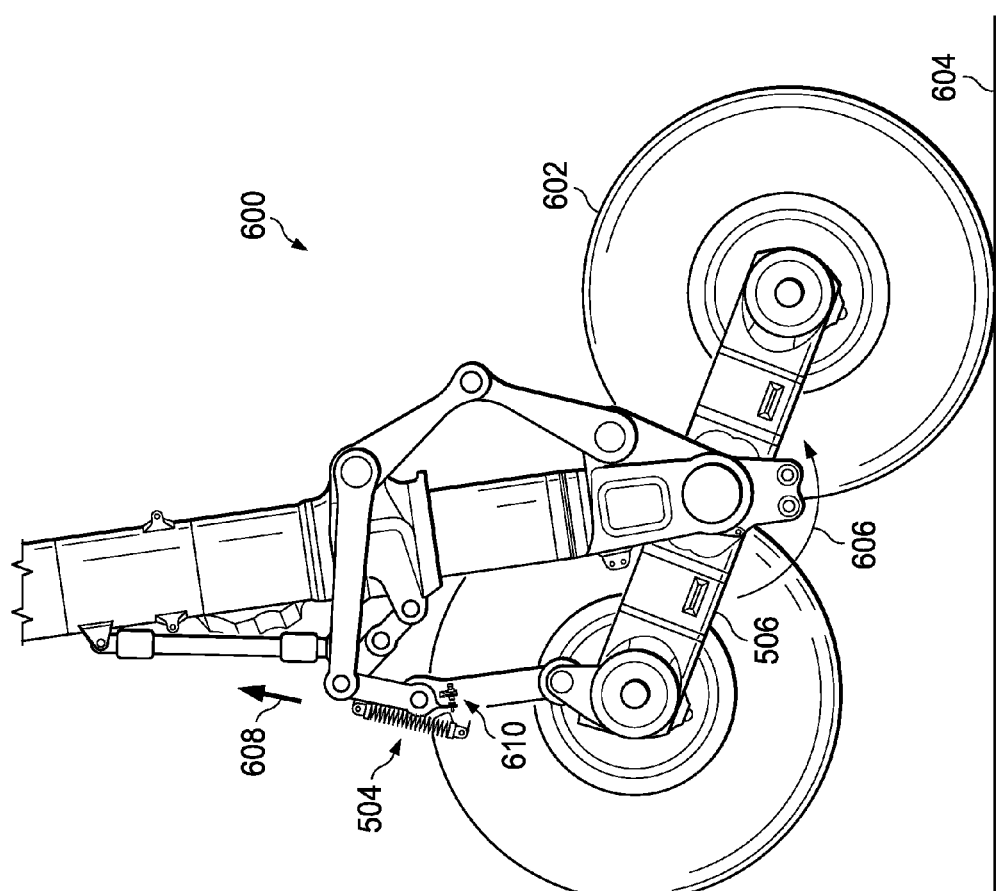
FIG. 6 is an illustration of a semi-levered landing gear of an airplane during initial touchdown in accordance with an advantageous embodiment.
Figure 7:
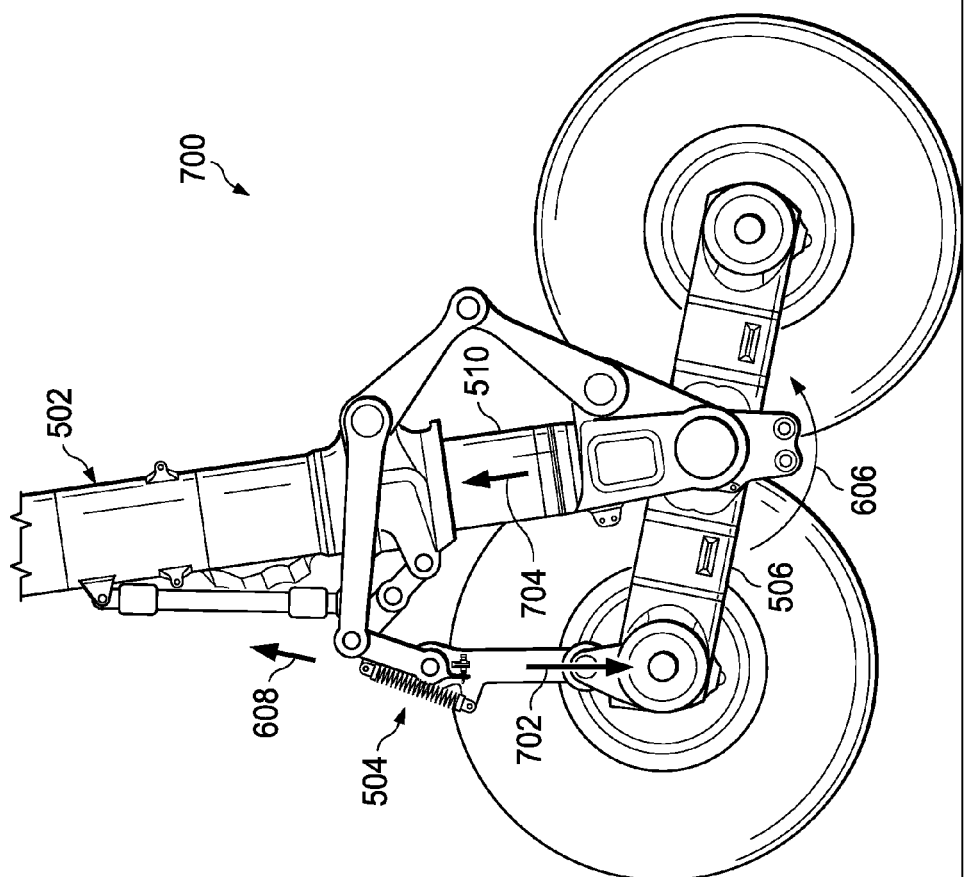
FIG. 7 is an illustration of a semi-levered landing gear of an airplane during touchdown in accordance with an advantageous embodiment.

In these examples, toes up position 308 is a position in which at least one front wheel of semi-levered landing gear 302 is positioned higher than at least one aft wheel connected to semi-levered landing gear 302. An illustration of toes up position 308 is shown in FIGS. 5-7.

In this illustrative example, toes up position 308 is an attitude in which truck beam 304 is positioned at a first angle 330. First angle 330 may be any angle of truck beam 304 in which one or more wheels mounted on the front axle of semi-levered landing gear 302 are higher than that of one or more wheels mounted on an aft axle of semi-levered landing gear 302.

In an advantageous embodiment, first angle 330 is an angle between a range of about forty (40) degrees and about eighty (80) degrees. In another advantageous embodiment, first angle 330 is about sixty (60) degrees. These angles may be less than or greater than the aforementioned values.

Positioning mechanism 332 is connected to locking mechanism 314. Locking mechanism 314 is connected to truck beam 304. Positioning mechanism 332 may secure truck beam 304 in toes up position 308 prior to initial ground contact with the ground 301, such as, without limitation, during touchdown in a landing procedure.

Steady state 316 is an orientation of semi-levered linkage assembly 504 in which tension loads and/or compression loads applied to semi-levered linkage assembly 504 are insufficient to change steady state 316 to locked state 318. Steady state occurs when the aircraft is fully in the air.

The term "tension load" refers to the force of pull supplied by strings, ropes, chains, or other members. The tension load may also be called tension force. A compression load is a force or pressure that attempts to compress, flatten, or squeeze a material. The term "compression load" refers to a pushing force. Tension load is the opposite of compression load.

Figure 10:
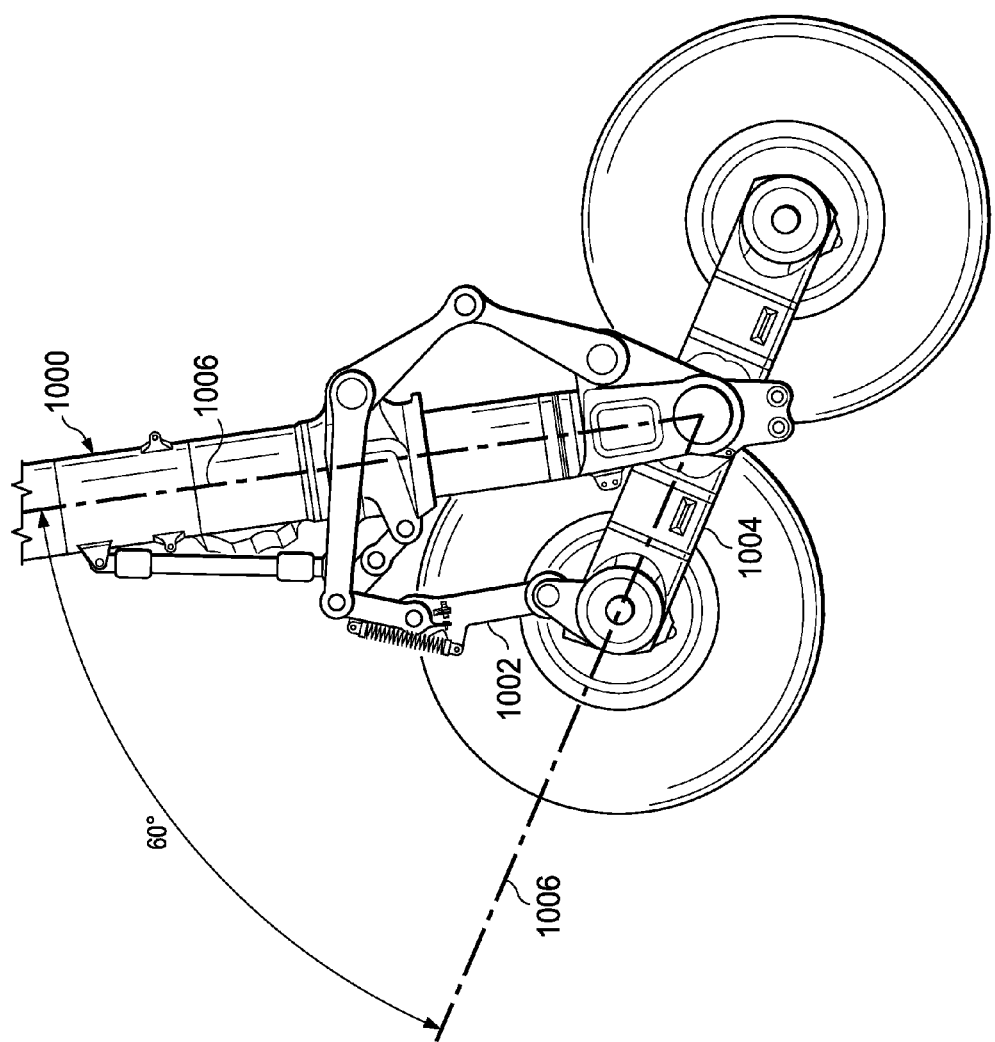
FIG. 10 is an illustration of a semi-levered landing gear in a steady state orientation in accordance with an advantageous embodiment.
Figure 11:
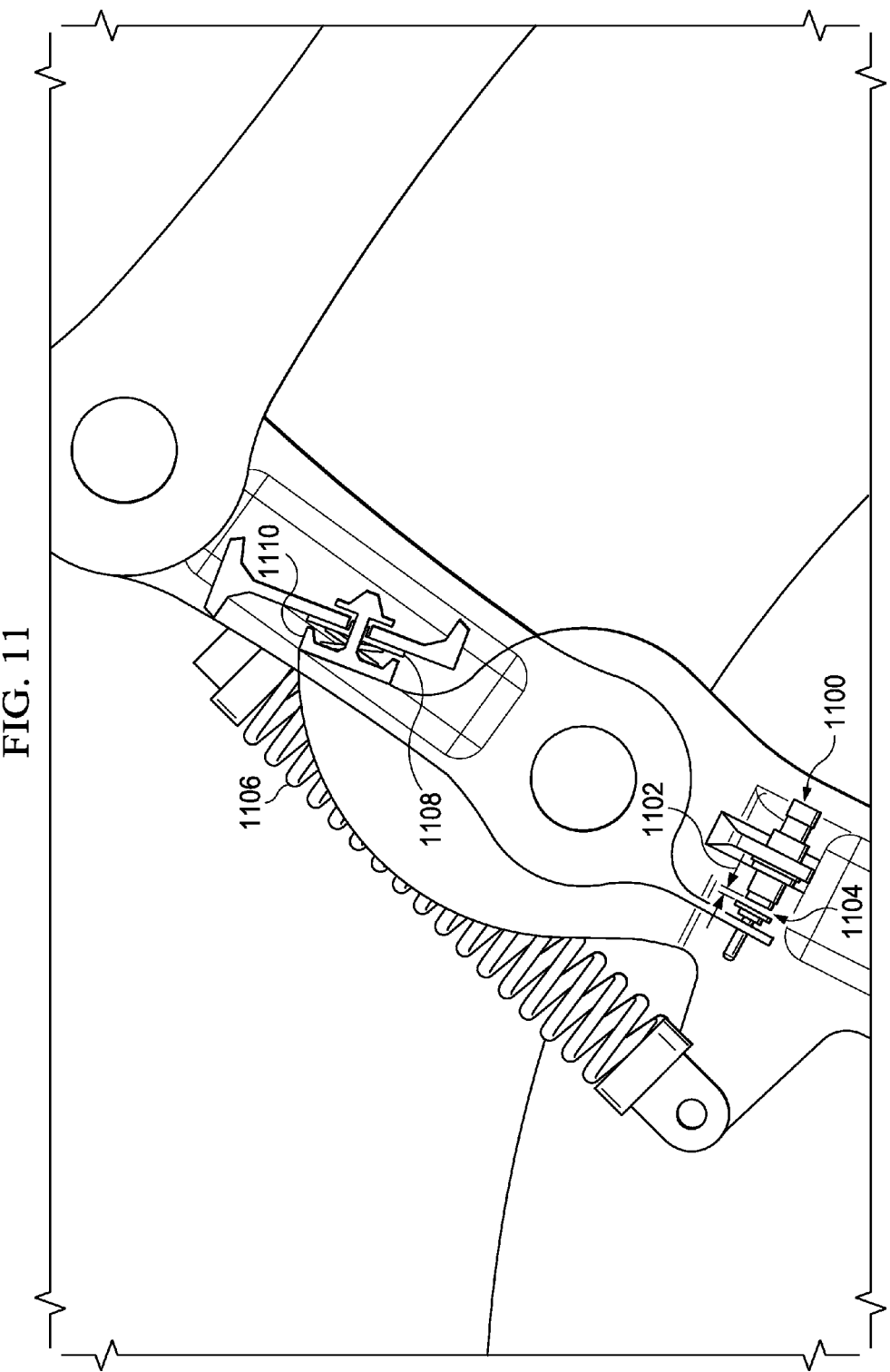
FIG. 11 is an illustration of a sensor connected to a semi-levered landing gear in accordance with an advantageous embodiment.

An illustrative example of a landing gear in a steady state orientation is shown in FIG. 10 and FIG. 11 below.

Locked state 318 is an orientation of locking mechanism 314 when tension loads applied to locking mechanism 314 are sufficient to move one or more members of locking mechanism 314.

In another advantageous embodiment, locking mechanism 314 changes from steady state 316 to locked state 318 when the tension load on semi-levered landing gear 302 is sufficient to rotate truck beam 304 a pre-determined degree of rotation.

The pre-determined degree of rotation may be any degree of rotation that places truck beam 304 at second angle 320. Second angle 320 is an angle that is greater than first angle 330. In other words, second angle 320 is an angle that positions the forward axle at a lower toes up position than first angle 330.

In an advantageous embodiment, second angle 320 is about one tenth (0.1) of a degree or greater than first angle 330. For example, if first angle 330 is sixty (60) degrees, second angle 320 may be about 60.1 degrees. These angles are illustrative examples only, and may be varied. Locking mechanism 314, in this advantageous embodiment, remains in steady state 316 prior to semi-levered landing gear 302 making initial ground contact with the ground 301.

As used herein, "initial ground contact" refers to some member of semi-levered landing gear 302 touching down on the ground 301. For example, without limitation, initial ground contact may refer to one or more wheels on semi-levered landing gear 302 touching the ground 301 during landing. In one advantageous embodiment, initial ground contact occurs when an aft tire of the semi-levered landing gear contacts the ground 301 or another surface during landing of an aircraft.

Prior to initial ground contact, semi-levered landing gear 302 does not have any member or component in contact with the ground 301, such as, for example, without limitation, throughout retraction or extension of semi-levered landing gear 302. Upon touchdown, truck beam 304 pivots about pivot pin 306, imparting a tension load in Semi-levered linkage assembly 504. The load in semi-levered landing gear 302 is changed, causing Semi-levered linkage assembly 504 to move from steady state 316 to locked state 318.

The changing orientation of Semi-levered linkage assembly from steady state 316 to locked state 318 may be detected using sensor 322. Sensor 322 may be implemented as, for example, without limitation, any type of standard proximity sensor, contact switch, pressure sensor, rotary variable differential transformer (RVDT), linear variable differential transformer (LVDT), or any other displacement sensing technologies.

In this illustrative example, sensor 322 is connected to Semi-levered linkage assembly 504. Sensor 322 detects a change in orientation of Semi-levered linkage assembly 504 from steady state 316 to locked state 318. This change indicates that semi-levered landing gear 302 has made initial ground contact with the ground 301.

Thus, in this illustrative example, air-ground detection system 300 is configured such that semi-levered landing gear 302 may remain locked in a semi-lever mode on landing. Semi-levered linkage assembly 504 may be in an almost locked position until touchdown occurs. Upon touchdown, the weight of the airplane or other vehicle associated with semi-levered landing gear 302 pulls Semi-levered linkage assembly 504 completely into locked state 318.

In other words, the weight of the vehicle settling on semi-levered landing gear 302 may result in an increased tension load on Semi-levered linkage assembly 504 which changes Semi-levered linkage assembly 504 locking mechanism 314 from steady state 316 to locked state 318. Sensor 322 senses this motion as Semi-levered linkage assembly 504 changes from steady state 316 to locked state 318.

The illustration of semi-levered landing gear 302 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, the advantageous embodiments could be in an aircraft such as an airplane or other aerospace vehicle.

Figure 4:
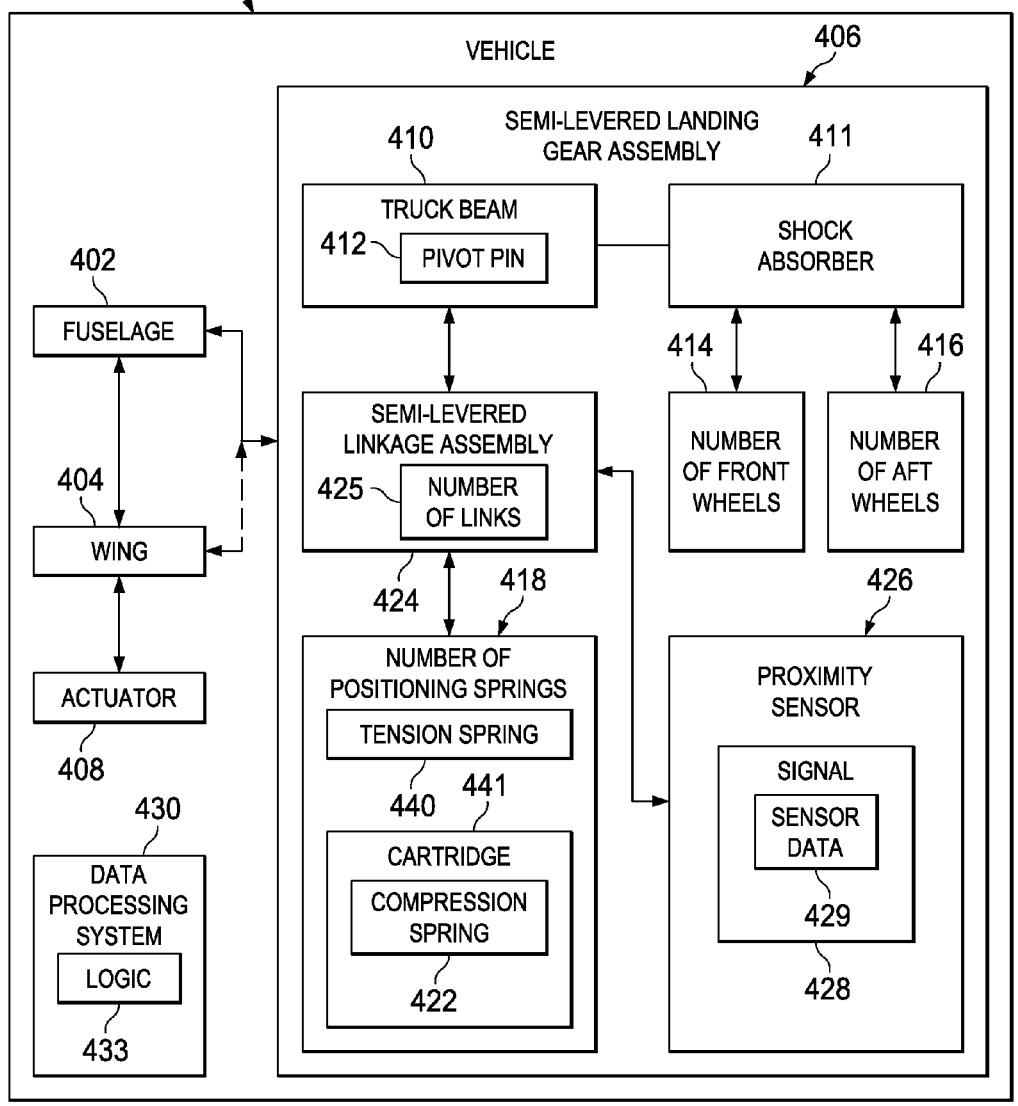
FIG. 4 is an illustration of a block diagram of a vehicle in which an advantageous embodiment may be implemented.

Turning now to FIG. 4, an illustration of a block diagram of a vehicle is depicted in which an advantageous embodiment may be implemented. Vehicle 400 may be aircraft 200 in FIG. 2 or any other vehicle in which a landing gear or an air-ground detection system might be used, such as, without limitation, aerospace vehicles.

Vehicle 400 may include fuselage 402, which is connected to wing 404. Semi-levered landing gear assembly 406 may be connected to at least one of fuselage 402, wing 404, and actuator 408. Semi-levered landing gear 406 may be, for example, without limitation, a landing gear in vehicle 400, such as semi-levered landing gear 302 in FIG. 3.

Actuator 408 may be any mechanism for changing the orientation of a truck beam. Actuator 408 may be, for example, without limitation, a hydraulic actuator, an electric motor, or any other suitable type of actuator.

In an advantageous embodiment, semi-levered landing gear assembly 406 includes truck beam 410 connected to shock absorber 411. Shock absorber 411 may also be referred to as a shock strut or an oleo.

Truck beam 410 is a tiltable truck beam. "Tiltable" refers to the ability of truck beam 410 to rotate about pivot pin 412 and to tilt up or tilt down. Truck beam 410 may be truck beam 304 in FIG. 3.

Truck beam 410 is mounted on pivot pin 412. Pivot pin 412 provides a pivot point for rotation of truck beam 410. Truck beam 410 rotates about pivot pin 412. In these illustrative examples, pivot pin 412 enables truck beam 410 to rotate from a toes up position to a toes down position. Pivot pin 412 may be implemented as a pivot point, such as, for example, without limitation, pivot pin 306 in FIG. 3.

In an advantageous embodiment, truck beam 410 may rotate from a level or an approximately horizontal position to the toes up position. In another advantageous embodiment, truck beam 410 may rotate about pivot pin 412 from the toes down position to the toes up position. The toes up position may be a position such as toes up position 308 in FIG. 3.

As described above, the toes up position refers to a position in which one or more wheels mounted on the front axle of semi-levered landing gear assembly 406 are positioned higher than one or more wheels mounted on the aft axle of semi-levered landing gear assembly 406.

In this illustrative example, truck beam 410 supports a number of front wheels 414 on the front axle and a number of aft wheels 416 on the aft axle. As used herein, a number of items refers to one or more items.

Additionally, the advantageous embodiments are not limited to implementation with landing gear that have wheels mounted on only two axles. The advantageous embodiments may be implemented with landing gear that have wheels mounted on two axles, three axles, or any other number of axles supporting one or more wheels. In other words, there may be a plurality of additional axles between the forward axle supporting the forward wheels and the aft axle supporting the aft wheels.

Number of front wheels 414 may include one or more wheels. Number of aft wheels 416 may, likewise, include one or more wheels. Number of positioning springs 418 may include one or more positioning springs, such as, for example, without limitation, tension spring 440 and compression spring 422.

Number of positioning springs 418 may be connected to one or more links in number of links 425 within semi-levered linkage assembly 424.

In this advantageous embodiment, semi-levered linkage assembly 424 includes, without limitation, number of links 425 jointed together. A link in number of links 425 may be a single member of the semi-levered linkage assembly. A link may also be referred to as a linkage arm.

Number of positioning springs 418 may be adapted to exert forces required to hold the steady state position of semi-levered linkage assembly 424 to resist the aerodynamic forces applied to semi-levered landing gear assembly 406, such as, without limitation, air loads. Number of positioning springs 418 holds semi-levered linkage assembly 424 in the steady state position prior to initial ground contact.

In this example, number of positioning springs 418 may include one or more positioning springs. Number of positioning springs 418 may include, for example, without limitation, tension spring 440 and compression spring 422. Tension spring 440 and compression spring 422 may be adapted to exert force in opposition to one another to secure an angle of truck beam 410 in a toes up position and secure semi-levered linkage assembly 424 in a steady state, such as steady state 316 in FIG. 3, or as described elsewhere herein.

In these illustrative examples, touchdown occurs when at least one wheel in number of aft wheels 416 comes in contact with the ground. When touch down occurs, tension load on semi-levered linkage assembly 424 increases. This increase in load on semi-levered linkage assembly 424 may be sufficient to overcome the load on one or more springs in number of positioning springs 418. This increase in load may move at least one link in number of links 425 from the steady state into the locked state.

In one advantageous embodiment, compression spring 422 may be installed with a pre-load greater than the load capability of tension spring 440. The pre-load may be achieved by installing compression spring 422 within cartridge 441 or other retention device that limits the maximum length of compression spring 422. In this manner, the steady state position of semi-levered linkage assembly 424 may be specifically determined.

Compression spring 422 may be restrained in a pre-loaded position within cartridge 441 or some other retention device such that compression spring 422 cannot push against a second link within number of links 425 past the steady state position. This may be done to achieve the steady state condition.

In one advantageous embodiment, compression spring 422 within number of positioning springs 418 of a positioning mechanism may be connected, directly or indirectly, to a link within number of links 425 of the Semi-levered linkage assembly 504 Compression spring 422 may be restrained in a pre-loaded position. The pre-loaded position is an attitude in which compression spring 422 is prevented from applying force to a second link within number of links 425 of the Semi-levered linkage assembly 504 when the Semi-levered linkage assembly 504 is compressed beyond the steady state position. As used herein, the term "compressed beyond the steady state" means the Semi-levered linkage assembly 504 is compressed so that the angle between the first and second link is smaller than the angle between the first and second link in the steady state position.

In one embodiment, if compression spring 422 is not limited to the steady state position, semi-levered linkage assembly 424 may close to a new steady state position. This position may not be as stable as desired, because forces exerted by tension spring 440 and compression spring 422 may cancel each other out. A small amount of tension or compression may cause the mechanism to move.

The advantageous embodiments recognize that it may be undesirable to have semi-levered linkage assembly 424 move under tension or compression values lower than a pre-determined load value. In one advantageous embodiment, the pre-determined load value may be a value within a range of about 100 to 500 pounds. In another advantageous embodiment, the pre-determined load value is about 400 pounds.

Number of positioning springs 418 also serves to hold the linkage assembly in the steady state position so that the linkage assembly holds the truck beam 410 in the correct orientation when semi-levered landing gear assembly 406 is retracted. The spring forces are calculated to hold the linkage in the steady state position to resist the force of gravity and inertia acting on semi-levered linkage assembly 424 and truck beam 410 during maneuvering of vehicle 400.

In an advantageous embodiment, semi-levered linkage assembly 424 may be connected to number of positioning springs 418 in a steady state orientation prior to number of aft wheels 416 making contact with the ground, such as, for example, without limitation, during a landing procedure for vehicle 400. At touchdown, the tension load on semi-levered linkage assembly 424 increases. Due to this increase in tension load, number of links 425 within semi-levered linkage assembly 424 changes orientation from the steady state to a locked state upon initial ground contact of number of aft wheels 416 with the ground.

In one advantageous embodiment, for example, without limitation, a change in the tension load on semi-levered linkage assembly 424 that is greater than a pre-determined load value overcomes the force exerted by compression spring 422 to lock semi-levered linkage assembly 424.

However, the advantageous embodiments are not limited to locking under loads of about 400 pounds or more. The advantageous embodiments may be implemented to lock semi-levered linkage assembly 424 under a variety of tension loads. In this manner, one or more links within number of links 425 changes orientation from the steady state to the locked state when semi-levered landing gear 406 makes initial ground contact with the ground.

Proximity sensor 426 may be connected to semi-levered landing gear assembly 406. Proximity sensor 426 detects a change in orientation of number of links 425 within semi-levered linkage assembly 424 from the steady state to the locked state indicating occurrence of the initial ground contact.

In one advantageous embodiment, when proximity sensor 426 detects the movement of number of links 425 as semi-levered linkage assembly 424 changes state from the steady state to the locked state, proximity sensor 426 generates signal 428 indicating that the initial ground contact has occurred. Signal 428 may include sensor data 429 captured or generated by proximity sensor 426. Proximity sensor 426 sends signal 428 and/or sensor data 429 indicating the initial ground contact to the relevant vehicle systems. The relevant vehicle systems may use the indication of initial ground contact with the ground to perform functions, such as, for example, without limitation, deploying spoilers and applying brakes.

Vehicle 400 may optionally include a flight computer, such as data processing system 430. Data processing system 430 may be implemented as any type of computing device on board vehicle 400. Data processing system 430 may be implemented as one or more data processing systems including one or more processors and one or more tangible forms of computer memory, such as, for example, but not limited to, random access memory, hard disk drives, and other suitable tangible forms of computer memory. In yet other illustrative examples, data processing system 430 not be a general purpose computer with software. Instead, data processing system 430 may be a device with a number of circuits configured to perform desired functions and/or processes. These number of circuits may include, for example, at least one of an integrated circuit, an application specific integrated circuit, a programmable array logic, a programmable logic array, a general logic array, a field programmable gate array, a programmable logic device, a complex programmable logic device, a programmable logic controller, a macrocell array, and other suitable types of circuits.

Data processing system 430 may execute logic 433 to identify a sequence of indicated Semi-levered linkage assembly 504 un-commanded movements associated with the change in state of semi-levered linkage assembly 406 from the steady state orientation to the locked state orientation. Logic 433 may compare the sequence of Semi-levered linkage assembly 504 un-commanded movements to a number of sensed flight phase indications to positively identify initial ground contact. The term "sensed flight indicators" refers to flight indicators such as, for example, without limitation, throttle position and/or shock absorber compression.

Sensed flight indicators are not limited to only throttle position and/or shock absorber compression. The advantageous embodiments do not require use of throttle position and/or shock absorber compression. The advantageous embodiments may use sensor data 429 from any other sensor devices associated with vehicle 400. Optionally, data from data processing system 430 may include a flight computer, which may be used as the sensor data 429.

The illustration of vehicle 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, semi-levered linkage assembly 424 might be considered part of the positioning mechanism 332. Shock absorber 411 need not be considered part of semi-levered landing gear assembly 406.

FIGS. 5-11 are illustrations of a semi-levered landing gear in use depicted in accordance with an advantageous embodiment. Therefore, FIGS. 5-11 share the same reference numerals and may correspond to the same components and have similar structure and functions.

The advantageous embodiments shown in FIGS. 5-11 illustrate one implementation for semi-levered landing gear assembly 406 in FIG. 4 and air-ground detection system 216 in FIG. 2. Not all components described with respect to FIG. 4 are necessarily shown with respect to FIGS. 5-11; however, all such components may be present in some advantageous embodiments. Moreover, the advantageous embodiments described herein may not be limited to the components in precisely the same configuration as shown in FIGS. 5-11.

With reference now to FIG. 5, an illustration of a semi-levered landing gear is depicted in accordance with an advantageous embodiment. Semi-levered landing gear 500 is an example of one implementation for semi-levered landing gear assembly 406 in FIG. 4.

As depicted in this illustrative example, semi-levered landing gear 500 is connected to shock strut 502 extending downwardly from the fuselage of an aircraft or other vehicle. Shock strut 502 generally includes outer cylinder 503 and inner cylinder 510. Shock strut 502 may also be referred to as a shock absorber, or may be part of a shock absorber, such as shock absorber 411 of FIG. 4. Semi-levered landing gear 500 is also connected to truck beam 506 pivotally connected to inner cylinder 510 by pivot pin 508. Truck beam 506 includes front end 505 and opposed aft end 507. Front end 505 of truck beam 506 includes front axle 514 and, similarly, aft end 507 includes aft axle 512. As shown in FIG. 5, one or more of wheels 511 may be mounted upon front axle 514 and aft axle 512 for take-off, taxi, and landing and also to support the aircraft during ground operations.

In FIG. 5, semi-levered landing gear 500 is depicted in a steady state. As defined above, a steady state is an orientation of the Semi-levered linkage assembly 504 in which tension loads and/or compression loads applied to the Semi-levered linkage assembly 504 are insufficient to change the steady state to a locked state. Steady state position may be a state such as, without limitation, steady state 316 in FIG. 3. A steady state position may be held while a vehicle is descending on approach to a landing area, but not yet touching the ground.

Semi-levered landing gear 500 may be a semi-levered landing gear assembly associated with a vehicle, such as, for example, without limitation, an airplane or other aircraft. Semi-levered landing gear 500 may be a landing gear, such as semi-levered landing gear 302 in FIG. 3 or semi-levered landing gear assembly 406 in FIG. 4.

Semi-levered landing gear 500 is shown extended outside a wheel well of an aircraft during flight in a steady state while the aircraft is in the air upon approach. Pivot pin 508 connects truck beam 506 to inner cylinder 510. Pivot pin 508 may be a pivot point for truck beam 506. Pivot pin 508 may be pivot pin 306 in FIG. 3 and/or pivot pin 412 in FIG. 4.

Positioning system 515 positions truck beam 506 in a fixed, toes-up attitude. As described above, the toes-up attitude refers to a position in which truck beam 506 is tilted at an angle such that front axle 514 is higher than aft axle 512, such as, for example, without limitation, steady state 316 in FIG. 3.

Still referring to FIG. 5, semi-levered landing gear 500 also includes semi-levered linkage assembly 504. Semi-levered linkage assembly 504 may also comprise a number of links, such as, for example, without limitation, number of links 425 in FIG. 4, for angularly orienting truck beam 506. Semi-levered linkage assembly 504 has a large moment arm to resist rotation of truck beam 506 in the steady state until a pre-determined load value is reached. As described above, a steady state is an orientation of the Semi-levered linkage assembly 504 in which tension loads and/or compression loads applied to the Semi-levered linkage assembly 504 are insufficient to change the steady state to a locked state.

The steady state tension and compression capability of semi-levered linkage assembly 504 in this advantageous embodiment may have a pre-determined load value. In one illustrative example, this pre-determined load value may be a value in a range between about 100 to about 500 pounds, but may be less than or greater than these values.

The pre-determined load value is any pre-determined load amount that triggers the change in orientation of semi-levered linkage assembly 504. In this advantageous embodiment, semi-levered linkage assembly 504 opens to a locked position for a pre-determined tension load value. The pre-determined tension load value may be any value in a range between about 100 and 700 pounds. In one advantageous embodiment, the pre-determined tension load value is greater than or equal to about 200 pounds. The pre-determined tension load may be greater than or less than these values.

Likewise, semi-levered linkage assembly 504 folds closed under a compression load that reaches a pre-determined compression load value. In this example, semi-levered linkage assembly 504 folds closed under a compression load that is greater than about 200 pounds, though this value may vary. However, the advantageous embodiments are not limited to opening in a locked position at a pre-determined load value of about 200 pounds. The pre-determined load value may be about 100 pounds, about 270 pounds, about 500 pounds, or any other value of the pre-determined load value.

Turning now to FIG. 6, an illustration of a semi-levered landing gear of an airplane during initial touchdown is depicted in accordance with an advantageous embodiment. Initial touchdown position 600 for semi-levered landing gear 500 occurs when aft wheels 602 make contact with ground 604 for the first time during landing. Initial touchdown position 600 may be a position for a semi-levered landing gear, such as semi-levered landing gear 500 in FIG. 5.

Semi-levered landing gear 500 is in a fixed, toes-up attitude in which truck beam 506 is tilted at an angle such that front axle 514 is higher than aft axle 512. As described above, the toes up position is a configuration in which the forward wheels on the main landing gear are at a higher position than that of the rear wheels on the main landing gear. During initial touchdown, truck beam 506 undergoes a counterclockwise rotation 606 about pivot pin 508, thereby creating a tension load in semi-levered linkage assembly 504. The tension load vector is shown by arrow 608.

Sensor 610 may be connected to semi-levered linkage assembly 504. Sensor 610 may be implemented as any type of proximity sensor, such as, without limitation, sensor 322 in FIG. 3 or proximity sensor 426 in FIG. 4. Sensor 610 may sense that semi-levered linkage assembly 504 has been loaded in tension, indicating that the aft wheels 602 have touched down. The sensor is described further with respect to FIG. 11.

With reference now to FIG. 7, an illustration of a semi-levered landing gear of an airplane during touchdown is depicted in accordance with an advantageous embodiment. Continued touchdown position 700 may be a position for a semi-levered landing gear, such as semi-levered landing gear 500 of FIG. 5.

Continued touchdown position 700 is a position of semi-levered landing gear 500 as inner cylinder 510 compresses, as shown by arrow 704, under the weight of the airplane as the aft wheels 602 make continued contact with ground 604.

Semi-levered landing gear 500 may be in a fixed, toes-up attitude, in which truck beam 506 is tilted at an angle such that front axle 514 is higher than aft axle 512. Pivot pin 508 connects truck beam 506 to inner cylinder 510. Truck beam 506 continues to undergo the counterclockwise rotation 606 about pivot pin 508 as the tension load in semi-levered linkage assembly 504 increases under the weight of the airplane as the airplane settles onto semi-levered landing gear 500. The tension load vectors are shown by arrow 608 and arrow 702. In other words, the tension load, as shown by arrows 608 and 702, increases because an increasing amount of the weight of the airplane is settling on semi-levered landing gear 500.

Figure 8:
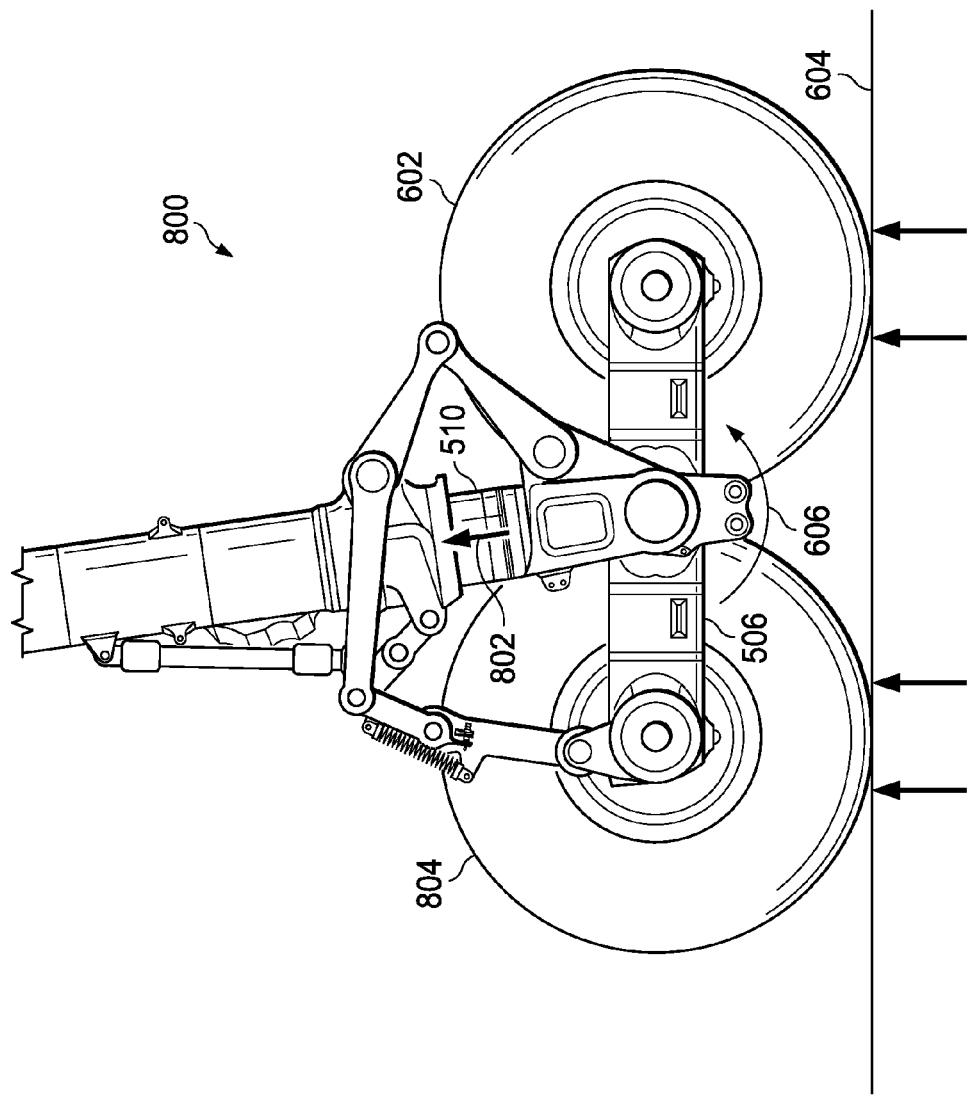
FIG. 8 is an illustration of a semi-levered landing gear of an airplane during touchdown in accordance with an advantageous embodiment.

Turning now to FIG. 8, an illustration of a semi-levered landing gear of an airplane at touchdown is depicted in accordance with an advantageous embodiment. Front wheel touchdown position 800 may be a position for a semi-levered landing gear, such as semi-levered landing gear 500 in FIG. 5.

Front wheel touchdown position 800 is a position of semi-levered landing gear 500 as inner cylinder 510 continues to compress under the weight of the airplane, as shown by arrow 802. Truck beam 506 continues to undergo counterclockwise rotation 606 until front wheels 804 contacts ground 604. In this illustrative example, truck beam 506 is approximately parallel with ground 604 such that front axle 514 is about level with aft axle 512.

The tension load in semi-levered linkage assembly 504 is relieved as the weight of the aircraft is distributed across front wheels 804 and aft wheels 602. Thus, as the airplane continues to settle to the ground, inner cylinder 510 compresses until front wheels 804 touch ground 604.

Figure 9:
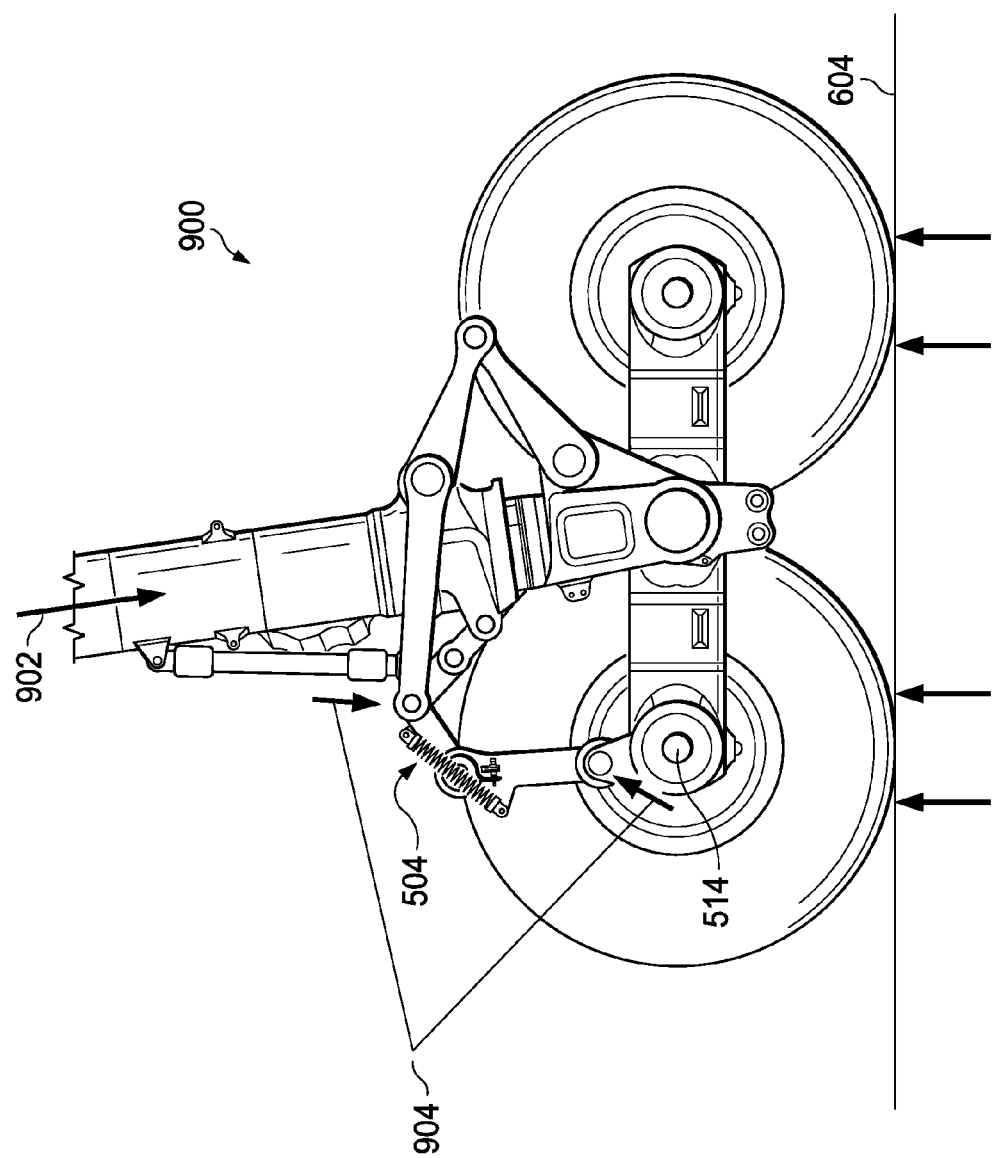
FIG. 9 is an illustration of a semi-levered landing gear of an airplane in a static state on the ground in accordance with an advantageous embodiment.

Referring now to FIG. 9, an illustration of a semi-levered landing gear of an airplane in a static state on the ground is depicted in accordance with an advantageous embodiment. Ground position 900 may be a position for a semi-levered landing gear, such as semi-levered landing gear 500 in FIG. 5.

An airplane fully in ground position 900 is in a position in which the full weight of the airplane is resting on the landing gears. This state may be referred to as a landed static state. In an advantageous embodiment, the airplane in the landed static state may be rolling down the runway, taxiing to the terminal, or stationary.

In this illustrative example, the airplane's front axle 514 and aft axle 512 are approximately parallel with ground 604. Aft wheels 602 connected with aft axle 512 are in contact with ground 604.

Inner cylinder 510 is fully compressed under the weight of the airplane, as shown by arrow 902. Semi-levered linkage assembly 504 is compressed under the load from front axle 514. The compression load on semi-levered linkage assembly 504 is shown by arrows 904.

The compression load in semi-levered linkage assembly 504 is greater than the steady state load. In this example, continued compression of inner cylinder 510 unlocks semi-levered linkage assembly 504 which disengages semi-levered landing gear 500. Further detail regarding semi-levered linkage assembly 504 and related springs and sensors is described with respect to FIG. 11.

With reference now to FIG. 10, an illustration of a semi-levered landing gear in a steady state orientation is depicted in accordance with an advantageous embodiment. Semi-levered landing gear 1000 is a landing gear, such as semi-levered landing gear 302 in FIG. 3 and semi-levered landing gear assembly 406 in FIG. 4. Semi-levered landing gear 1000, which may also be semi-levered landing gear 500 of FIG. 5, is in a steady state in the air, as shown in FIGS. 3, 5, and 10. As defined above, a steady state is an orientation of the locking mechanism in which tension loads and/or compression loads applied to the locking mechanism are insufficient to change the steady state to a locked state.

Semi-levered linkage assembly 1002 includes a locking mechanism having a number of links, such as, for example, without limitation, locking mechanism 314 in FIG. 3 and semi-levered linkage assembly 424 in FIG. 4.

In this illustrative example, semi-levered linkage assembly 1002 keeps truck beam 1004 positioned at about a sixty (60) degree angle 1006 toes up until such time as the aft tires touchdown on the ground. However, the advantageous embodiments are not limited to implementation with a sixty degree angle.

The advantageous embodiments may be implemented with semi-levered landing gear 1000 having truck beam 1004 positioned at any angle in a toes up position until such time as the aft tires touchdown on the ground. For example, truck beam 1004 may be at about a 61 degree angle, about a 59 degree angle, about a 55 degree angle, about a 45 degree angle, or any other suitable angle associated with a toes up position of truck beam 1004. These angles may vary.

Turning now to FIG. 11, an illustration of a sensor connected to a semi-levered landing gear is depicted in accordance with an advantageous embodiment. Sensor 1100 is a sensor for detecting a change in state of a semi-levered linkage assembly, such as, without limitation, sensor 322 in FIG. 3 or proximity sensor 426 in FIG. 4.

Sensor 1100, in this illustrative example, is a proximity sensor for detecting a change in distance or gap 1102 between sensor 1100 and target 1104. However, the advantageous embodiments are not limited to a proximity sensor. The advantageous embodiments may be implemented using any suitable type of sensor for detecting a displacement in a linkage assembly. FIG. 11 also depicts tension spring 1106, compression spring 1108, and stop 1110.

While a landing gear is in the air, the linkage assembly is in a steady state, as shown in FIG. 10. While in the steady state, gap 1102 may be a distance between target 1104 and sensor 1100. In this example, gap 1102 is a target far gap indicating that target 1104 is far from sensor 1100. A target far gap may be any distance between target 1104 and sensor 1100 indicating a steady state orientation. In this advantageous embodiment, the target far gap is a distance greater than about 0.07 inches, though this distance may vary by up to an inch or more.

Figure 12:
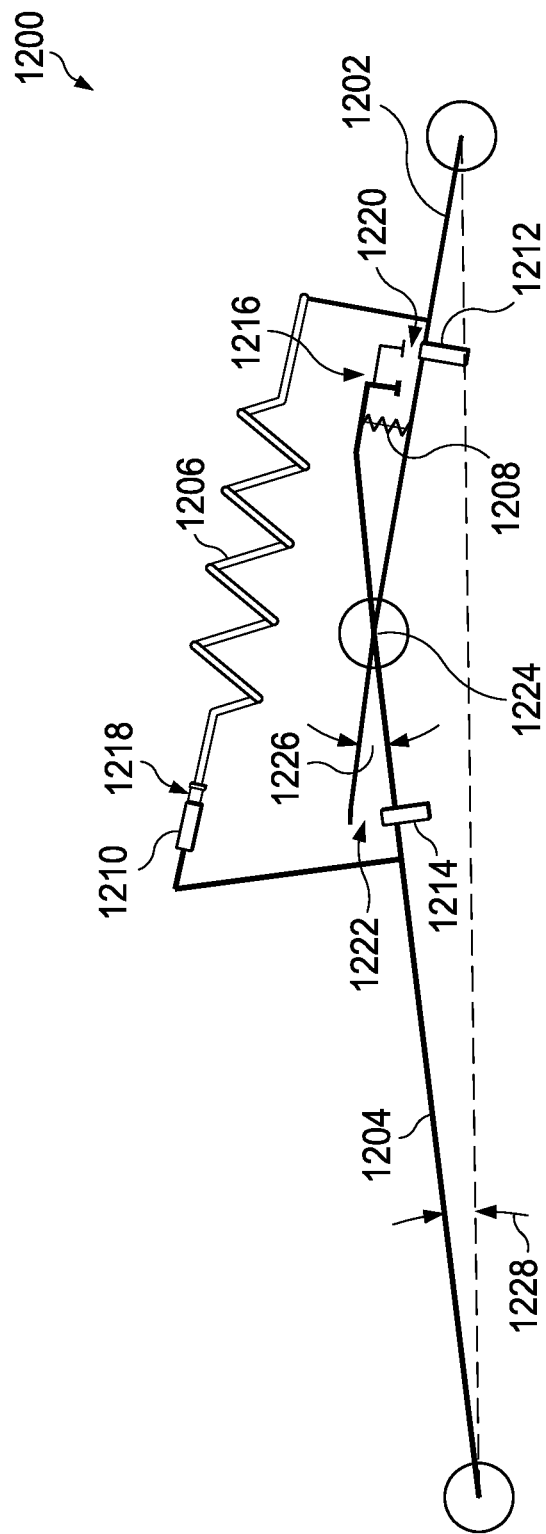
FIG. 12 is an illustration of a diagram of a semi-levered landing gear with positioning springs in a steady state in accordance with an advantageous embodiment.

With reference now to FIG. 12, an illustration of a diagram of a semi-levered landing gear with positioning springs in a steady state is depicted in accordance with an advantageous embodiment. Semi-levered linkage assembly 1200 may be a locking mechanism such as, without limitation, locking mechanism 314 in FIG. 3 and semi-levered linkage assembly 424 in FIG. 4.

Semi-levered linkage assembly 1200 may include first link 1202 and second link 1204. In one advantageous embodiment, but without limitation, first link 1202 may be an upper link in semi-levered linkage assembly 1200 and second link 1204 may be a lower link of semi-levered linkage assembly 1200. Moreover, the advantageous embodiments are not limited to a semi-levered linkage assembly having first link 1202 and second link 1204. Other advantageous embodiments may include a semi-levered linkage assembly having other additional links not shown in FIG. 12. Additionally, a tension load may be applied to semi-levered linkage assembly 1200 that is less than a pre-determined tension load value.

Semi-levered linkage assembly 1200 may be secured in a steady state by two positioning springs, such as, for example, without limitation, tension spring 1206 and compression spring 1208. Tension spring 1206, in this illustrative example, is connected to both first link 1202 and second link 1204. Compression spring 1208, in this illustrative example, is only connected to first link 1202. Tension spring 1206 and compression spring 1208 may be implemented using coil springs, Belleville springs, pneumatic springs, lever springs, or any other suitable type of tension and compression springs.

Tension spring 1206 and compression spring 1208 work against each other to position semi-levered linkage assembly 1200 in the steady state orientation. Tension spring 1206 and compression spring 1208 are positioning springs sized to prevent air loads, retraction loads, and maneuver loads from disturbing the position of the truck beam.

In one advantageous embodiment, tension spring 1206 may hold first link 1202 and second link 1204 in the steady state under compression loads less than a pre-determined compression load value. In this advantageous embodiment, semi-levered linkage assembly 1200 includes at least one sensor for detecting when semi-levered linkage assembly 1200 has been displaced from the steady state orientation. The one or more sensors may include sensors 1210, 1212, and 1214.

A sensor may be connected to semi-levered linkage assembly 1200 at a variety of positions to sense that semi-levered linkage assembly 1200 has been loaded in tension, indicating that the aft tires of a landing gear have touched down. For example, sensor 1210 is mounted in-line with tension spring 1206. Sensor 1212 is mounted to first link 1202 proximate to compression spring 1208 and stop 1216. As used herein, a "stop" is some object that impedes an ability of another object to move with respect to the stop. Sensor 1214 is mounted to a second location on second link 1204.

However, the advantageous embodiments are not limited to attaching a sensor to only the three locations shown in FIG. 12. A sensor may be placed on semi-levered linkage assembly 1200 at any other location such that the sensor may detect a displacement of one or more linkages in semi-levered linkage assembly 1200 from the steady state.

The sensors 1210, 1212, and 1214 in this illustrative example may be proximity sensors having a gap between the sensor and the target associated with that sensor, such as gap 1218, gap 1220, and gap 1222. In this illustrative example, the gap for each sensor indicates that the sensor is far from the sensor's associated target. For example, without limitation, gap 1218 indicates sensor 1210 is far from the target associated with sensor 1210.

The advantageous embodiments are not limited to implementation using proximity sensors. For example, sensor 1210 may be a linear variable differential transformer or string potentiometer located on a spring axis to measure a change in length of tension spring 1206. Likewise, a sensor may be mounted at apex 1224 to measure a change in angle 1226 between first link 1202 and second link 1204, such as a rotary variable differential transformer, a string potentiometer, a rotary encoder, or any other type of displacement sensing technology. The required spring force required to hold semi-levered linkage assembly 1200 in this steady state position for a given load may be calculated using spring moment arm and linkage angle alpha 1228.

FIG. 12 is intended as an example, and not as an architectural limitation, for the different advantageous embodiments. For example, the advantageous embodiments in FIG. 12 illustrate three sensors. However, the advantageous embodiments do not require three sensors. An air-ground detection system may only include one single sensor, as well as two or more sensors.

For example, in FIG. 12, compression spring 1208 is shown connected to second link 1204. However, the advantageous embodiments are not limited to attaching compression spring 1208 to second link 1204. Compression spring 1208 may be connected to one or more other links of semi-levered linkage assembly 1200 to hold first link 1202 away from second link 1204.

Compression spring 1208 need not be connected to second link 1204, but rather may be connected to some other link in semi-levered linkage assembly 1200. Compression spring 1208 may be connected to one link to fill the space between two links. In other words, compression spring 1208 may be connected to a first link in order to hold the first link away from the second link.

Figure 13:
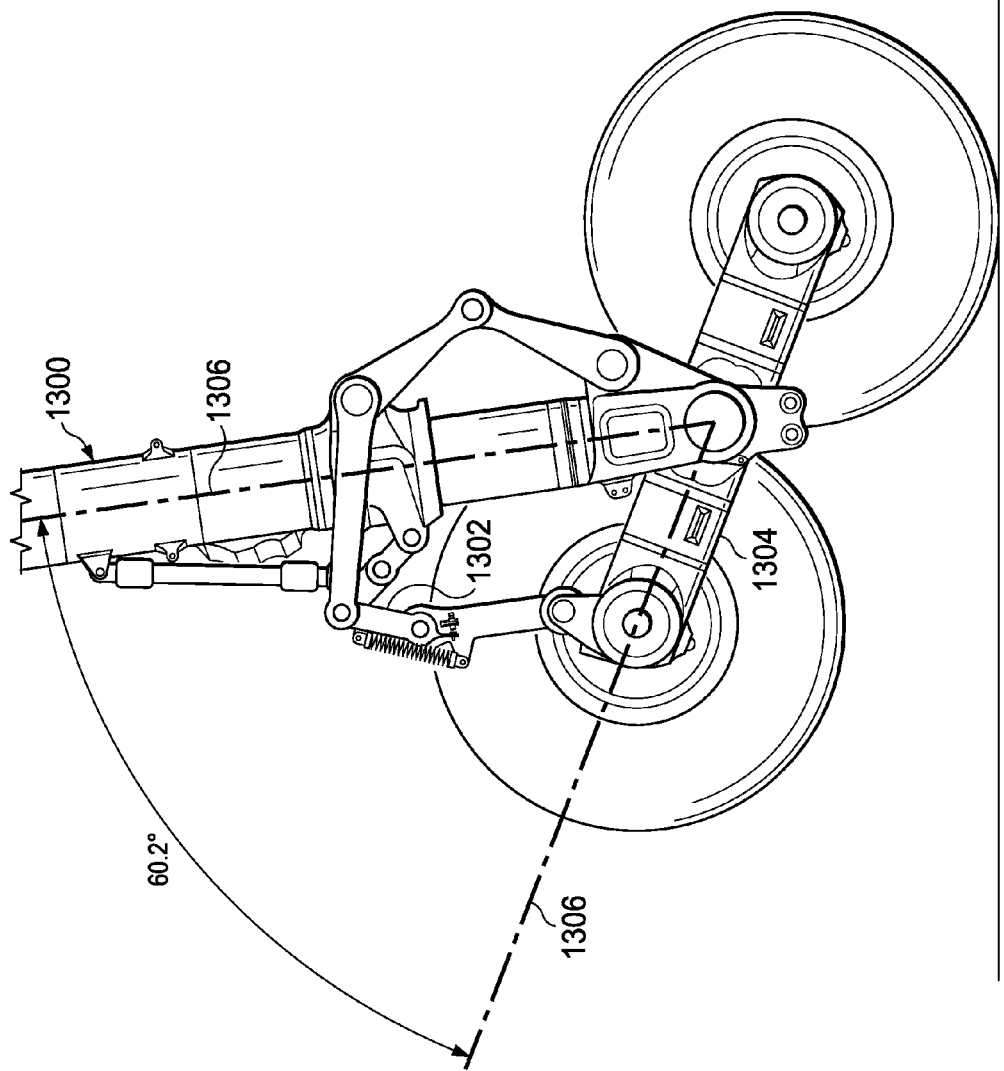
FIG. 13 is an illustration of a semi-levered linkage assembly in a locked state in accordance with an advantageous embodiment.

Turning now to FIG. 13, an illustration of a semi-levered linkage assembly in a locked state is depicted in accordance with an advantageous embodiment. Semi-levered landing gear 1300 is a landing gear such as semi-levered landing gear 302 in FIG. 3 and semi-levered landing gear assembly 406 in FIG. 4. Semi-levered landing gear 1300 is in a locked state at initial ground contact, such as initial touchdown position 600 in FIG. 6. Semi-levered landing gear 1300 may be semi-levered landing gear 500 in FIG. 5.

Semi-levered linkage assembly 1302 may be a locking mechanism having a number of links, such as, for example, without limitation, locking mechanism 314 in FIG. 3 and semi-levered linkage assembly 424 in FIG. 4. Semi-levered landing gear 1300 may be a landing gear with a locking mechanism such as, without limitation, locking mechanism 314 in FIG. 3 or semi-levered linkage assembly 424 in FIG. 4.

When the landing gear connected to semi-levered linkage assembly 1300 touches the ground during landing, truck beam 1304 pivots about a pivot point, such as pivot pin 508 in FIG. 5, and imparts a tension load in semi-levered linkage assembly 1302. If the tension load upon semi-levered linkage assembly 1302 is greater than about 200 pounds, then the links in semi-levered linkage assembly 1302 overcome the compression springs and lock semi-levered linkage assembly 1302 in the locked state.

Semi-levered linkage assembly 1302, when locked, positions truck beam 1304 at a pre-determined angle. In an advantageous embodiment, this pre-determined angle may be about 60.2 degrees 1306, though this value may be more or less. Thus, semi-levered linkage assembly 1302 may only undergo a pre-determined degree of rotation. In this example, the pre-determined degree of rotation may about two tenths (0.2) of a degree of rotation. However, the advantageous embodiments are not limited to two tenths of a degree of rotation. The advantageous embodiments may be implemented using any pre-determined degree of rotation, such as, for example, without limitation, three tenths (0.3) of a degree of rotation, five tenths (0.5) of a degree of rotation, or any other suitable greater or lesser pre-determined degree of rotation.

Other indication systems may use different degrees of rotation. For example, other indication systems may use five degrees of rotation or more, which may require more load on the semi-levered landing gear to achieve that degree of rotation. The advantageous embodiments shown in FIG. 13 may require less load on the landing gear to achieve about two tenths (0.2) of a degree of rotation. Therefore, the advantageous embodiments shown in FIG. 13 may permit quicker indication of touchdown.

Figure 14:
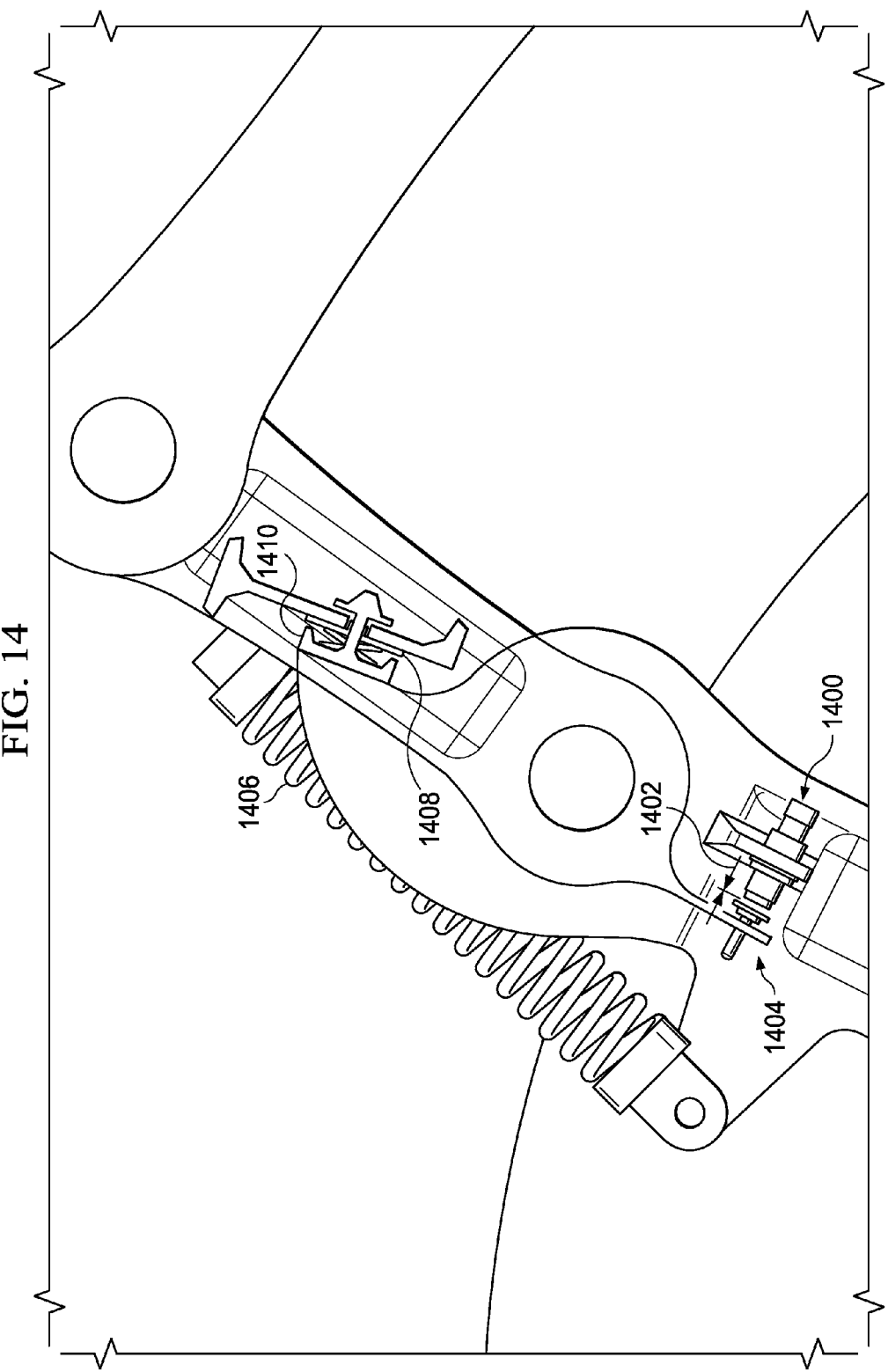
FIG. 14 is an illustration of a sensor connected to a semi-levered linkage assembly in a locked state in accordance with an advantageous embodiment.

Referring now to FIG. 14, an illustration of a sensor connected to a semi-levered linkage assembly in a locked state is depicted in accordance with an advantageous embodiment. Sensor 1400 may be a sensor for detecting a change in the state of a semi-levered linkage assembly, such as, for example, without limitation, sensor 322 in FIG. 3 or proximity sensor 426 in FIG. 4.

Sensor 1400, in this illustrative example, may be a proximity sensor for detecting a change in length of gap 1402 between sensor 1400 and target 1404. However, the advantageous embodiments are not limited to a proximity sensor. The advantageous embodiments may be implemented using any type of sensor for detecting a displacement in a semi-levered linkage assembly. FIG. 14 also depicts tension spring 1406, compression spring 1408, and stop 1410.

When the semi-levered landing gear touches the ground, the load on the semi-levered landing gear increases, and thereby increases the load on the semi-levered linkage assembly. The increase in tension load on the semi-levered linkage assembly results in the links changing their orientation from a steady state to a locked state.

Sensor 1400 may detect that the linkage changes from the steady state to the locked state. This change in state results in a decrease in gap 1402.

Gap 1402 indicates that target 1404 is near sensor 1400. Lack of any gap between target 1404 and sensor 1400 may indicate that the linkage assembly is in a locked state. In this case, at least one wheel of the semi-levered landing gear has made initial ground contact with the ground during landing.

Figure 15:
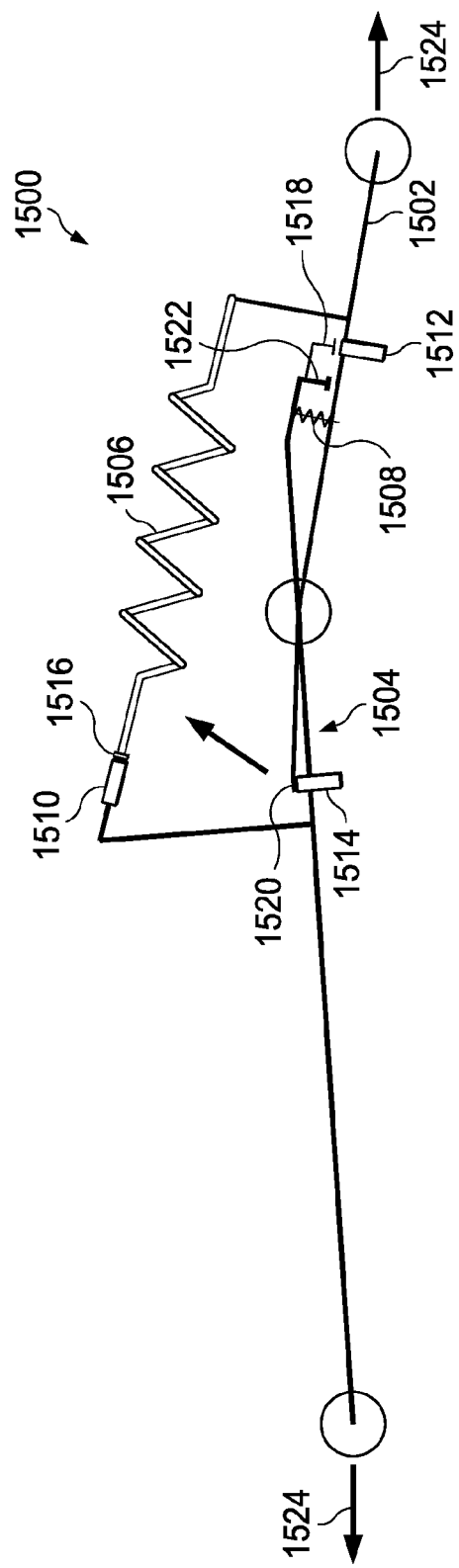
FIG. 15 is an illustration of a diagram of a semi-levered linkage assembly with a tension load applied during initial ground contact in accordance with an advantageous embodiment.

FIG. 15 is an illustration of a diagram of a semi-levered linkage assembly with a tension load applied during initial ground contact in accordance with an advantageous embodiment. Semi-levered linkage assembly 1500 is a locking mechanism such as, for example, without limitation, locking mechanism 314 in FIG. 3 or semi-levered linkage assembly 424 in FIG. 4.

Semi-levered linkage assembly 1500 may include, for example, without limitation, first link 1502 and second link 1504. First link 1502 and second link 1504 are links within semi-levered linkage assembly 1500. Semi-levered linkage assembly 1500 is not limited to including only two links. Semi-levered linkage assembly 1500 may include one or more other additional links not described or shown in FIG. 15.

Semi-levered linkage assembly 1500 may include two positioning springs, such as, for example, without limitation, tension spring 1506 and compression spring 1508. Tension spring 1506 in this illustrative example is connected to first link 1502 and second link 1504. Compression spring 1508 may be connected to second link 1504. However, the advantageous embodiments are not limited to only including a single tension spring, such as tension spring 1506, with another single compression spring, such as compression spring 1508. In other advantageous embodiments, semi-levered linkage assembly 1500 may be connected to one or more other springs not shown in FIG. 15.

Sensor 1510, sensor 1512, and sensor 1514 show only a near gap between the sensors 1510, 1512, and 1514 and their respective targets 1516, 1518, and 1520. For example, sensor 1510 has a near gap between it and target 1516. The term "near gap" is defined as a very small or negligible gap distance, quantified as being between about one thousandth (0.001) of an inch and one tenth (0.1) of an inch, indicating that target 1516 is near sensor 1510. The near gap may be any gap distance that is less than a far gap distance between target 1516 and sensor 1510. The term "far gap" is defined as a distance larger than a near gap.

These distances may vary. In an advantageous embodiment, a near gap distance may be any distance that is three hundredths (0.03) of an inch less than the far gap. In another advantageous embodiment, the near gap distance may be any distance within a range of one thousandth (0.001) of an inch and nine hundredths (0.09) of an inch. In yet another advantageous embodiment, the near gap may be about five thousandths (0.005) of an inch. In still another advantageous embodiment, a near gap distance may be, for example, without limitation, any distance that is less than about four hundredths (0.04) of an inch.

In one advantageous embodiment, stop 1522 is connected to semi-levered linkage assembly 1500. Stop 1522 may hold semi-levered linkage assembly 1500 in the locked state under tension loads exceeding the pre-determined tension load value.

Stop 1522 may be engaged to prevent additional rotation of semi-levered linkage assembly 1500 as tension load 1524 increases. In another illustrative example, stop 1522 may be engaged to stop rotation of a truck beam at a pre-determined degree of rotation in response to the change from the steady state to the locked state.

Figure 16:
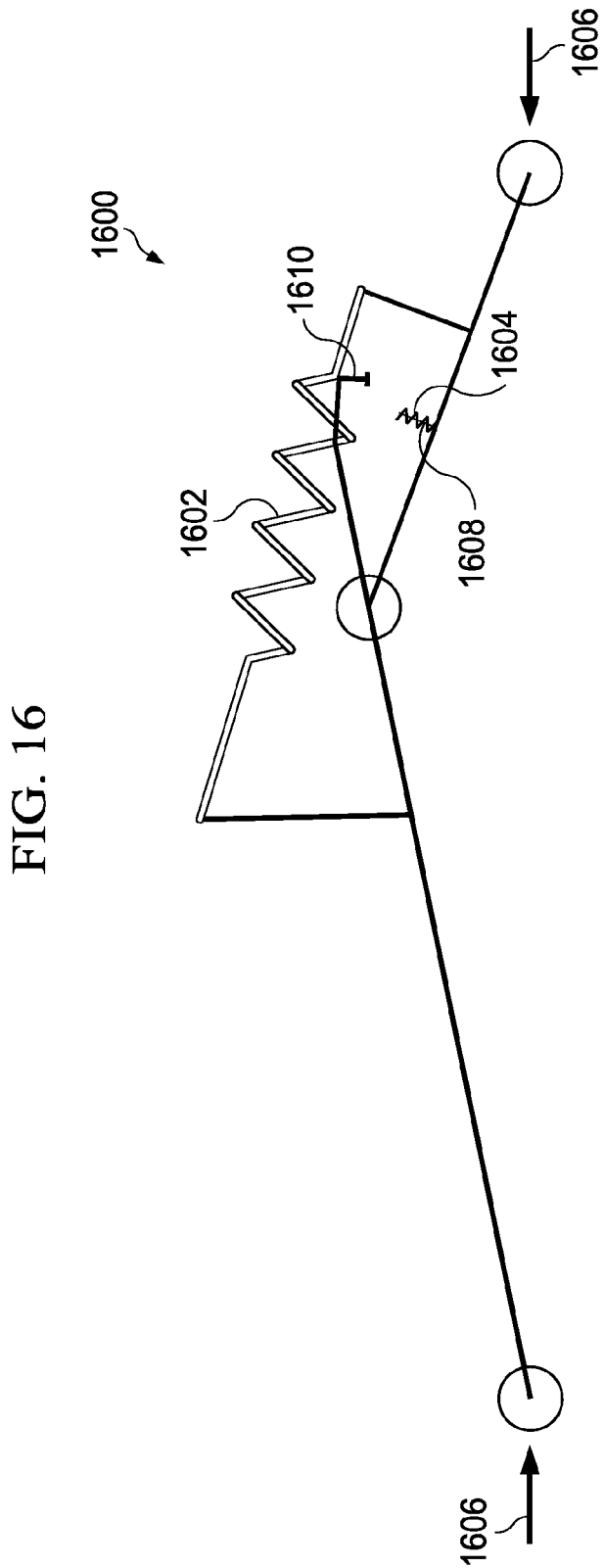
FIG. 16 is an illustration of a diagram of a semi-levered linkage assembly with a compression load in accordance with an advantageous embodiment.

With reference now to FIG. 16, an illustration of a diagram of a semi-levered linkage assembly with a compression load is depicted in accordance with an advantageous embodiment. Semi-levered linkage assembly 1600 may include tension spring 1602 and compression spring 1604. Compression load 1606 may be greater than the tension spring load in tension spring 1602.

Compression spring 1604 is not engaged in this illustrative example. Further travel of compression spring 1604 in this example may be constrained by cartridge 1608 in which stop 1610 is not engaged.

Thus, semi-levered linkage assembly 1600 may be folded closed under compression load 1606. Compression load 1606, in this illustrative example, may be about 200 pounds or more. However, the advantageous embodiments are not limited to a compression load of about 200 pounds to overcome the tension spring load in tension spring 1602. The advantageous embodiments may be implemented to configure tension spring 1602 such that a compression load that is equal to or less than about 200 pounds may overcome the tension spring load.

Figure 17:
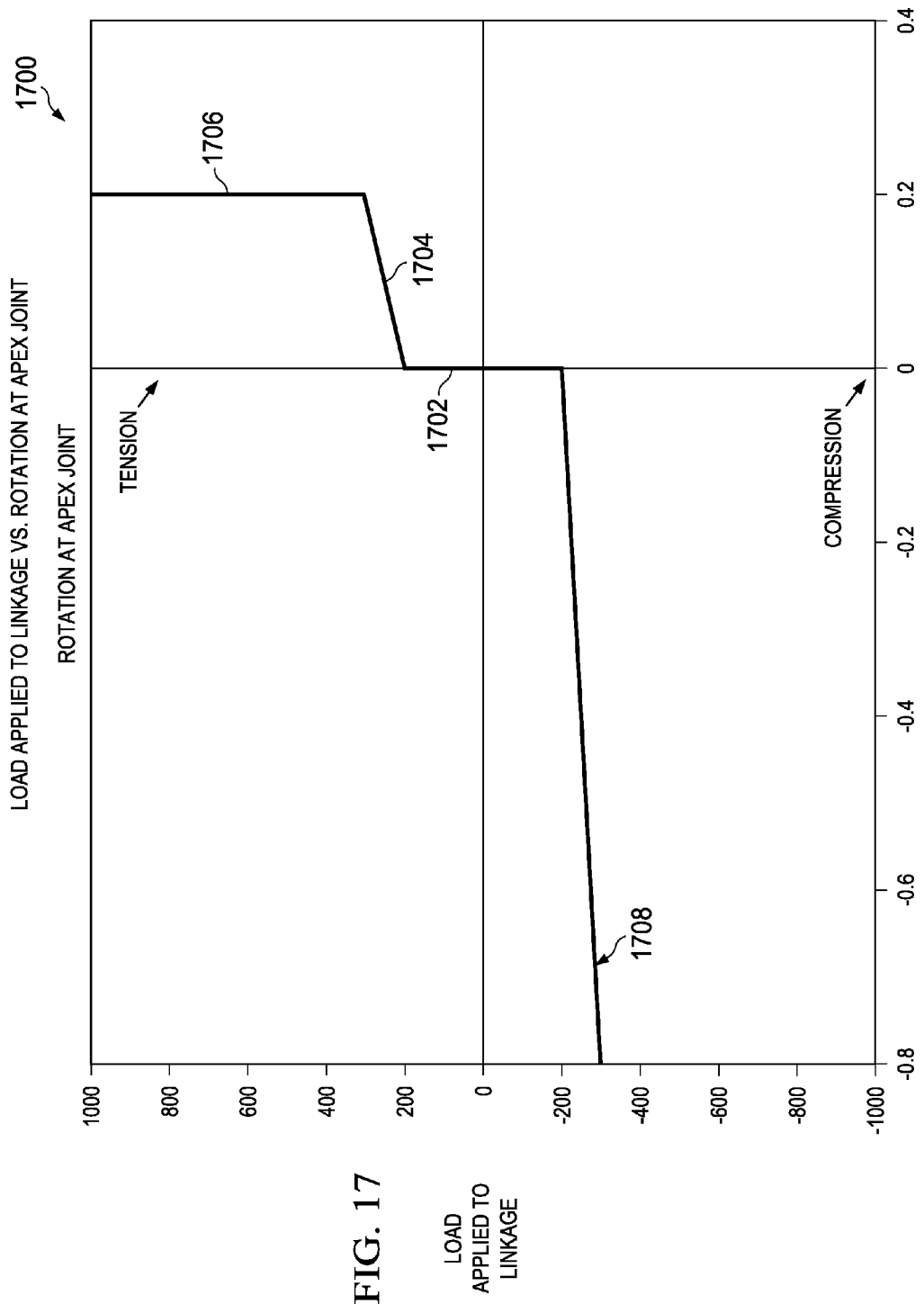
FIG. 17 is an illustration of a graph of a load applied to a semi-levered landing gear linkage assembly versus rotation at an apex joint in accordance with an advantageous embodiment.

Turning now to FIG. 17, an illustration of a graph of a load applied to a semi-levered landing gear linkage versus rotation at an apex joint is depicted in accordance with an advantageous embodiment. The advantageous embodiments described herein with respect to FIG. 17 describe particular values. These particular values may vary in different advantageous embodiments. Graph 1700 shows rotation at an apex joint of a semi-levered linkage assembly under tension and compression loads between zero to 1000 pounds.

Where the load applied to a semi-levered linkage assembly is between zero to 200 pounds, there is no rotation at the apex shown at segment 1702. Rotation does not occur because number of positioning springs 418 in FIG. 4 holds the semi-levered linkage assembly in the steady state until the linkage assembly is forced open by tension loads greater than 200 pounds, or forced closed by compression loads greater than 200 pounds. Thus, in this illustrative example, the steady state range is plus or minus 200 pounds.

At segment 1704, the semi-levered linkage assembly opens under tension loads higher than about 200 pounds. At two tenths (0.2) of a degree of rotation, a stop connected to the semi-levered linkage assembly prevents the semi-levered linkage assembly from undergoing additional rotation, even as the load increases. Segment 1706 shows increased load above 200 pounds without increased rotation. In other words, once the load exceeds 200 pounds, only 0.2 degrees of rotation occurs.

When the compression load reaches the pre-determined compression load value of 200 pounds, as shown in segment 1708, the semi-levered linkage assembly folds closed. The angle of the curve at segment 1708 is a function of the tension spring rate and spring effective moment arm.

Thus, a tension spring holds the semi-levered linkage assembly in a steady state under compression loads up to the pre-determined compression load value. When the compression load increases to the point that it exceeds the pre-determined compression load value, the semi-levered linkage assembly folds closed.

Figure 18:
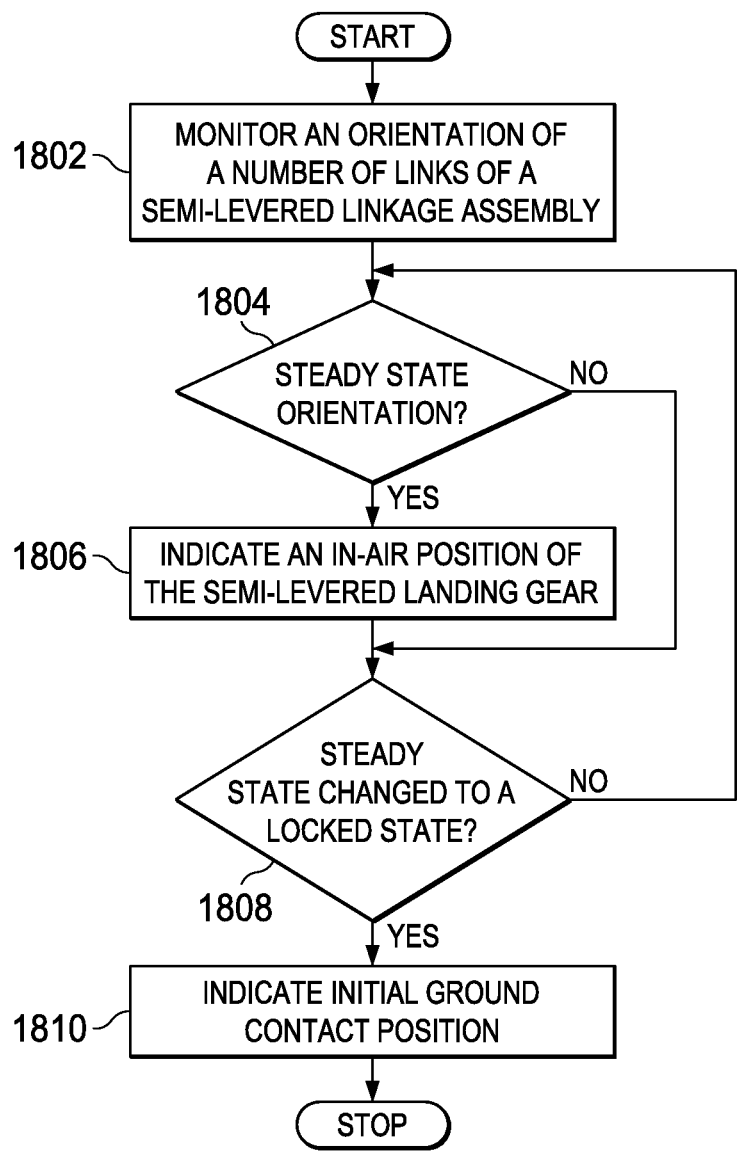
FIG. 18 is an illustration of a flowchart of a process for detecting an initial touchdown of a semi-levered landing gear in accordance with an advantageous embodiment.

Turning now to FIG. 18, an illustration of a flowchart of a process for detecting an initial touchdown of a semi-levered landing gear is depicted in accordance with an advantageous embodiment. The process depicted in FIG. 18 may be implemented by an air-ground detection system using a proximity sensor or any other type of displacement sensing device, such as air-ground detection system 300 in FIG. 3. The process in FIG. 18 may also be implemented using semi-levered linkage assembly 504 in FIG. 5, semi-levered landing gear 1000 in FIG. 10, and semi-levered linkage assembly 1200 of FIG. 12.

Any of these features may be described as a "device" suitable for implementing the process of FIG. 18.

The process begins by the device monitoring an orientation of a number of links of a semi-levered linkage assembly (operation 1802). The number of links may be number of links 425 in FIG. 4, and the semi-levered linkage assembly may be semi-levered linkage assembly 424 in FIG. 4. Then, the device detects whether a change occurs in the orientation of the semi-levered linkage assembly from a steady state (operation 1804). The steady state may be steady state 316 in FIG. 3.

If at operation 1804 there is no change detected in the orientation of the semi-levered linkage assembly from a steady state, the device determines whether the steady state has changed to a locked state (operation 1808). A change from the steady state to the locked state may be detected by a sensor, such as sensor 322 in FIG. 3. If, however, at operation 1804 the device determines that a change is detected in the orientation of the semi-levered linkage assembly to a locked state, the device indicates an in-air position of the semi-levered landing gear (operation 1806). The process proceeds to operation 1808. The semi-levered landing gear may be semi-levered landing gear 302 in FIG. 3.

At operation 1808, the device determines whether the semi-levered landing gear has changed from a steady state to a locked state. If at operation 1808 the device determines that the steady state has not changed to a locked state, the process returns to operation 1804. If, however, at operation 1808 the device determines that the steady state has changed to a locked state, the device indicates an initial ground contact position (operation 1810). The process terminates thereafter.

An indication of an in-air position in one advantageous embodiment may be indicated by a lack of notification of any change or initial ground contact. Referring again to FIG. 12, in an advantageous embodiment, an indication of an in-air position may also be indicated by tension spring 1206 and compression spring 1208 working against each other to position semi-levered linkage assembly 1200 in the steady state orientation.

Thus, the different advantageous embodiments recognize and take into account a number of considerations. For example, without limitation, the different advantageous embodiments recognize and take into account that semi-levered landing gears might fix rotation of a truck beam, with respect to the shock strut, to give certain performance advantages during takeoff and landing. However, the advantageous embodiments also recognize and take into account that semi-levered landing gears might constrain the rotation of the truck beam. When the truck beam is so constrained, truck beam rotation might not be used as an early indicator of ground contact by conventional air-ground detection systems. The advantageous embodiments described herein overcome this issue.

Therefore, an advantageous embodiment of the present disclosure provides a system for air-ground detection in semi-levered landing gear. A truck beam of a semi-levered landing gear is mounted on a pivot pin. The truck beam rotates from a toes up position to a toes down position. A toes up position refers to a position in which the truck beam is angled upward so that the front wheel or wheels on the semi-levered landing gear are positioned higher than the aft wheel or wheels.

A positioning mechanism may be connected to a locking mechanism and adapted to secure an angle of the truck beam in the toes up position. The positioning mechanism may an actuator or motor or other means of moving the locking mechanism and the truck beam. In FIG. 5, positioning system 515 is shown as including three links and one actuator.

The locking mechanism may be secured in a steady state orientation by a tension and compression spring or springs. The locking mechanism may be secured in a steady state condition for all conditions where the wheels of the landing gear are in-air and not contacting the ground. The positioning mechanism connected to a semi-levered linkage assembly of the locking mechanism may move the semi-levered linkage assembly to the toes up orientation prior to initial ground contact during a landing procedure.

The locking mechanism may be implemented as, for example, without limitation, a semi-levered linkage assembly. The semi-levered linkage assembly may optionally include a first link and a second link. The locking mechanism changes orientation from the steady state to a locked state upon initial ground contact.

A sensor connected to the locking mechanism may detect a change in orientation from the steady state to the locked state, indicating occurrence of the initial ground contact. The sensor may be implemented as, for example, without limitation, a proximity sensor or any other type of displacement sensing mechanism.

These features, and optionally others described herein, allow the advantageous embodiments to provide a reliable system for early detection of ground contact for a semi-levered landing gear that enhances landing efficiency. The advantageous embodiments enable early detection of ground contact by landing gear wheels for quick spoiler deployment and brake activation.

The advantageous embodiments also provide a quick and reliable touchdown indication that reduces landing roll length and brake wear. The advantageous embodiments recognize that sensing that the aft tires of an aircraft have touched down at an early stage of landing is desirable as a means for triggering other airplane systems, such as spoiler deployment and braking systems.

The flowcharts and block diagrams in the different depicted advantageous embodiments illustrate the architecture, functionality, and operation of some possible implementations of apparatuses and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example may also include item A, item B, and item C or item B and item C.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

The description of the different advantageous embodiments has been presented for the purposes of illustration and description, and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or advantageous embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. An air-ground detection system comprising:
    a truck beam of a semi-levered landing gear mounted on a pivot pin, wherein the truck beam is configured to rotate about the pivot pin between a toes down position and a toes up position;
    a positioning mechanism connected to a semi-levered linkage assembly that secures an angle of the truck beam in the toes up position, wherein the semi-levered linkage assembly is secured in a steady state and configured to change from the steady state to a locked state in response to an initial ground contact, the semi-levered linkage assembly comprising:
        a compression spring, the compression spring being configured to hold the semi-levered linkage assembly in a steady state under a tension load less than a pre-determined tension load value; and
        a tension spring, the tension spring being configured to hold the semi-levered linkage assembly in the steady state under a compression load less than a pre-determined compression load value and further being configured to permit the semi-levered linkage assembly to fold closed under a compression load exceeding the pre-determined compression load value; and
    a sensor connected to the semi-levered linkage assembly, wherein the sensor is configured to detect a change from the steady state to the locked state.

2. The air-ground detection system of claim 1, wherein the sensor is further configured to generate a signal indicating an occurrence of the initial ground contact in response to detecting the change from the steady state to the locked state.

3. The air-ground detection system of claim 1 further comprising:
    a first link and a second link of the semi-levered linkage assembly; and
    the compression spring being connected to the first link of the semi-levered linkage assembly, wherein the compression spring is restrained in a pre-loaded position and wherein the compression spring is prevented from applying force to the second link of the semi-levered linkage assembly when the semi-levered linkage assembly is compressed beyond the steady state.

4. The air-ground detection system of claim 1 further comprising:
    a stop connected to the semi-levered linkage assembly, wherein the stop is configured to hold the semi-levered linkage assembly in the locked state under a tension load exceeding a pre-determined tension load value.

5. The air-ground detection system of claim 1 further comprising:
    a stop connected to the semi-levered linkage assembly and operative to stop rotation of the truck beam at a pre-determined degree of rotation in response to the change from the steady state to the locked state.

6. The air-ground detection system of claim 1 further comprising:
    a compression spring connected to a first link; and
    a tension spring connected to the first link and a second link.

7. A vehicle comprising:
    a fuselage;
    a wing connected to the fuselage;
    a semi-levered landing gear assembly connected to at least one of the fuselage, the wing, and an actuator, wherein the semi-levered landing gear assembly comprises:
        a truck beam connected to a shock absorber and mounted on a pivot pin enabling the truck beam to rotate from a toes up position to a toes down position;
        a number of positioning springs connected to a semi-levered linkage assembly, wherein the number of positioning springs comprises a tension spring, the tension spring being configured to hold the semi-levered linkage assembly in the steady state under a compression load less than a pre-determined compression load value and further being configured to permit the semi-levered linkage assembly to fold closed under a compression load exceeding the pre-determined compression load value, and wherein a compression spring exerts force in opposition to secure the semi-levered linkage assembly in a steady state;
        the semi-levered linkage assembly connected to the truck beam and the positioning mechanism in a steady state prior to initial ground contact during a landing procedure;
        a number of links within the semi-levered linkage assembly, wherein the number of links is configured to change orientation from the steady state to a locked state in response to the initial ground contact of a number of aft wheels with a ground;
        a sensor connected to the semi-levered linkage assembly, wherein the sensor is configured to detect a change in the orientation of the number of links from the steady state to the locked state, and wherein the sensor is configured to generate a signal indicating an occurrence of the initial ground contact in response to detecting the change in the orientation from the steady state to the locked state; and
        a stop connected to the semi-levered linkage assembly, wherein the stop is configured to prevent opening of the semi-levered linkage assembly at a pre-determined degree of rotation of the truck beam in response to an increased tension load on the semi-levered linkage assembly of the semi-levered landing gear assembly, and wherein the pre-determined degree of rotation is two-tenths of a degree of rotation.

8. The vehicle of claim 7 further comprising:
    a first link connected to a compression spring; and
    a second link connected to a tension spring, wherein the first link is also connected to the tension spring.

9. The vehicle of claim 8, wherein the compression spring is configured to exert force in opposition to the tension spring to secure an angle of the truck beam in the toes up position prior to the initial ground contact of the semi-levered landing gear assembly.

10. The vehicle of claim 7 further comprising:
    a stop connected to the semi-levered linkage assembly, wherein the stop is configured to hold the semi-levered linkage assembly in the locked state under a tension load exceeding a pre-determined tension load value.

* * * * *